(12) United States Patent
Uomori et al.

(10) Patent No.: US 11,946,786 B2
(45) Date of Patent: Apr. 2, 2024

(54) DIAGNOSTIC APPARATUS, MEASUREMENT APPARATUS, DIAGNOSTIC METHOD, AND COMPUTER-READABLE MEDIUM

(71) Applicant: Yokogawa Electric Corporation, Tokyo (JP)

(72) Inventors: Yoshio Uomori, Tokyo (JP); Shinji Kanno, Tokyo (JP); Toshiyuki Miyata, Tokyo (JP); Madoka Ueno, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 43 days.

(21) Appl. No.: 17/643,400

(22) Filed: Dec. 8, 2021

(65) Prior Publication Data

US 2022/0187111 A1 Jun. 16, 2022

(30) Foreign Application Priority Data

Dec. 14, 2020 (JP) .................................. 2020-207116

(51) Int. Cl.
*G01F 1/32* (2022.01)
*G01F 1/325* (2022.01)

(52) U.S. Cl.
CPC .......... *G01F 1/3209* (2013.01); *G01F 1/3287* (2022.01)

(58) Field of Classification Search
CPC ............. G01F 1/20; G01F 1/32; G01F 1/3209
See application file for complete search history.

(56) References Cited

U.S. PATENT DOCUMENTS

| 8,079,271 B2 | 12/2011 | Hoecker |
| 10,444,044 B2 * | 10/2019 | Bell ......................... G01F 1/42 |
| 2020/0166398 A1 * | 5/2020 | Collister ................ G06N 20/00 |

FOREIGN PATENT DOCUMENTS

| JP | H0579870 A | 3/1993 |
| JP | H06207840 A | 7/1994 |
| JP | H11304557 A | 11/1999 |
| JP | 2003004497 A | 1/2003 |
| JP | 2008070292 A | 3/2008 |
| JP | 2009243943 A | 10/2009 |

OTHER PUBLICATIONS

Hondo, Vortex Flowmeter, Jan. 2003, FIT Computer Translation (Year: 2003).*
Kawano et al., Method for Predicting and Diagnosing Clogging of Vortex Flowmeter, Mar. 2008, FIT Computer Translation (Year: 2008).*

(Continued)

*Primary Examiner* — Erika J. Villaluna

(57) ABSTRACT

Provided is a diagnostic apparatus, including a diagnostic unit configured to diagnose a condition of a vortex flowmeter using a determination result of a magnitude of a signal component of each of at least one target detection signal among the at least one detection signal detected by the vortex flowmeter having a vortex generator and a detection unit configured to detect at least one detection signal according to a vortex generated by the vortex generator, or a magnitude of a signal component of at least one of combined signals configured to linearly combine two or more of the at least one detection signal.

19 Claims, 11 Drawing Sheets

(56) References Cited

OTHER PUBLICATIONS

Extended European Search Report for European Patent Application No. 21214052.9, issued by the European Patent Office dated May 3, 2022.
Office Action issued for counterpart Japanese Application No. 2020-207116, issued by the Japanese Patent Office dated Jan. 10, 2023 (drafted on Dec. 27, 2022).

* cited by examiner

DIAGNOSTIC APPARATUS, MEASUREMENT APPARATUS, DIAGNOSTIC METHOD, AND COMPUTER-READABLE MEDIUM

The contents of the following Japanese patent application(s) are incorporated herein by reference:
NO. 2020-207116 filed in JP on Dec. 14, 2020

BACKGROUND

1. Technical Field

The present invention relates to a diagnostic apparatus, a measurement apparatus, a diagnostic method and a computer-readable medium with a diagnostic program recorded thereon.

2. Related Art

Patent Document 1 discloses a vortex flowmeter. The vortex flowmeter in Patent Document 1 uses piezoelectric elements 81 and 82 to detect the alternating minute deformation of the vortex generator 7 caused by the Karman vortex generated when the fluid to be measured flowing in the pipeline 6 hits the vortex generator 7, and since the number of Karman vortices generated in a unit time is proportional to the flow velocity, the detected minute deformation is used to measure the Since the number of Karman vortices generated in a unit time is proportional to the flow velocity, the flow rate of the fluid to be measured is measured using the detected micro-deformation (paragraphs 0002 to 0007 and so on).

Patent Document 2 describes "a vortex flowmeter that uses the first and second vortex signals output from two detection units that detect vortex signals generated by vortex generators and outputs the signal ratio of said first and second vortex signals along with the vortex flow signal," and that "the signal ratio is collected by the equipment management tool for predictive diagnosis of clogging of the vortex flowmeter" (claim 1).

Patent document 3 describes a vortex flowmeter that "digitizes the vortex signal and converts it into the frequency domain by high-speed Fourier transform, and determines the presence or absence of noise by a determination method set in this frequency domain" (paragraph 0027).

PRIOR ART DOCUMENT

Patent Document

Patent Document 1: Japanese Patent Application Publication No. 2003-4497
Patent Document 2: Japanese Patent Application Publication No. 2008-70292
Patent Document 3: Japanese Patent Application Publication No. H5-79870

SUMMARY

A first aspect of the present invention provides a diagnostic apparatus. The diagnostic apparatus may include a diagnostic unit that diagnoses the condition of the vortex flowmeter using a determination result of a magnitude of a signal component of each of at least one target detection signal among the at least one detection signal detected by the vortex flowmeter having a vortex generator and a detection unit that detects at least one detection signal according to a vortex generated by the vortex generator, or a magnitude of a signal component of at least one signal component of a combined signal that linearly combines two or more of the at least one detection signal.

The diagnostic unit may diagnose the condition of the vortex flowmeter based on the determination result acquired by comparing the magnitude of the signal component of the combined signal with the threshold.

The diagnostic apparatus may include a normalization unit for normalizing the magnitude of the signal component of the combined signal with the vortex frequency.

The diagnostic unit may diagnose that the vortex flowmeter is abnormal based on the determination result that the normalized magnitude of the signal component of the combined signal is less than or equal to the first threshold.

The diagnostic unit may predict that the vortex flowmeter is abnormal based on the determination result that the normalized magnitude of the signal component of the combined signal is greater than the first threshold and less than or equal to the second threshold.

The diagnostic apparatus may further include a training processing unit that generates the first threshold by learning, using the history of the normalized magnitudes of the signal components of the combined signal.

The diagnostic apparatus may include a time series data storage unit that stores time series data of the normalized magnitude of the signal components of the combined signal. The diagnostic apparatus may include a display processing unit that performs display processing to display the time series data.

The diagnostic unit may diagnose the condition of the vortex flowmeter based on the determination result of the change in magnitude of the respective signal components of the at least one target detection signal.

The diagnostic unit may diagnose the condition of the vortex flowmeter based on the determination results of the change in the magnitude of the signal component according to the vortex frequency for each of the at least one target detection signal.

The diagnostic apparatus may include a history storage unit that stores history data that maps the magnitude of the signal component according to the vortex frequency to the vortex frequency for each of the at least one target detection signal in the past. The diagnostic unit may diagnose the condition of the vortex flowmeter based on the determination result of the difference between the magnitude of the signal component corresponding to the vortex frequency corresponding to the vortex frequency of the at least one target detection signal to be diagnosed included in the history data and the magnitude of the signal component of the at least one target detection signal to be diagnosed.

The diagnostic apparatus may include a normalization unit that normalizes the magnitude of the signal components of each of the at least one target detection signal by the vortex frequency.

The diagnostic unit may diagnose that the vortex flowmeter is abnormal based on the determination result that the normalized magnitude of the signal component of each of the at least one target detection signal is less than or equal to the first threshold for each of the at least one target detection signal.

A second aspect of the present invention provides a measurement apparatus including a diagnostic apparatus and a vortex flowmeter.

A third aspect of the present invention provides a diagnostic method. The diagnostic method may include acquiring a magnitude of a signal component of each of at least one target detection signal of the at least one detection signal detected by a vortex flowmeter having a vortex generator and a detection unit that detects at least one detection signal according to a vortex generated by the vortex generator, or acquiring the magnitude of at least one signal component of a combined signal that is a linear combination of two or more of the at least one detection signal. The diagnostic method may include diagnosing the condition of the vortex flowmeter using the determination results of the magnitude of the signal components.

A fourth aspect of the present invention provides a computer-readable medium with a diagnostic program, which is executed by a computer, recorded thereon. The diagnostic program may cause a computer to function as a diagnostic apparatus, including a diagnostic unit that diagnoses the condition of the vortex flowmeter using a determination result of a magnitude of a signal component of each of at least one target detection signal among the at least one detection signal detected by the vortex flowmeter having a vortex generator and a detection unit that detects at least one detection signal according to a vortex generated by the vortex generator, or a magnitude of a signal component of at least one signal component of a combined signal that linearly combines two or more of the at least one detection signal.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described by way of embodiments of the invention, but the following embodiments are not intended to limit the invention according to the claims. And all the combinations of the features described in the embodiment(s) are not necessarily essential to means provided by aspects of the invention.

Figure 1:
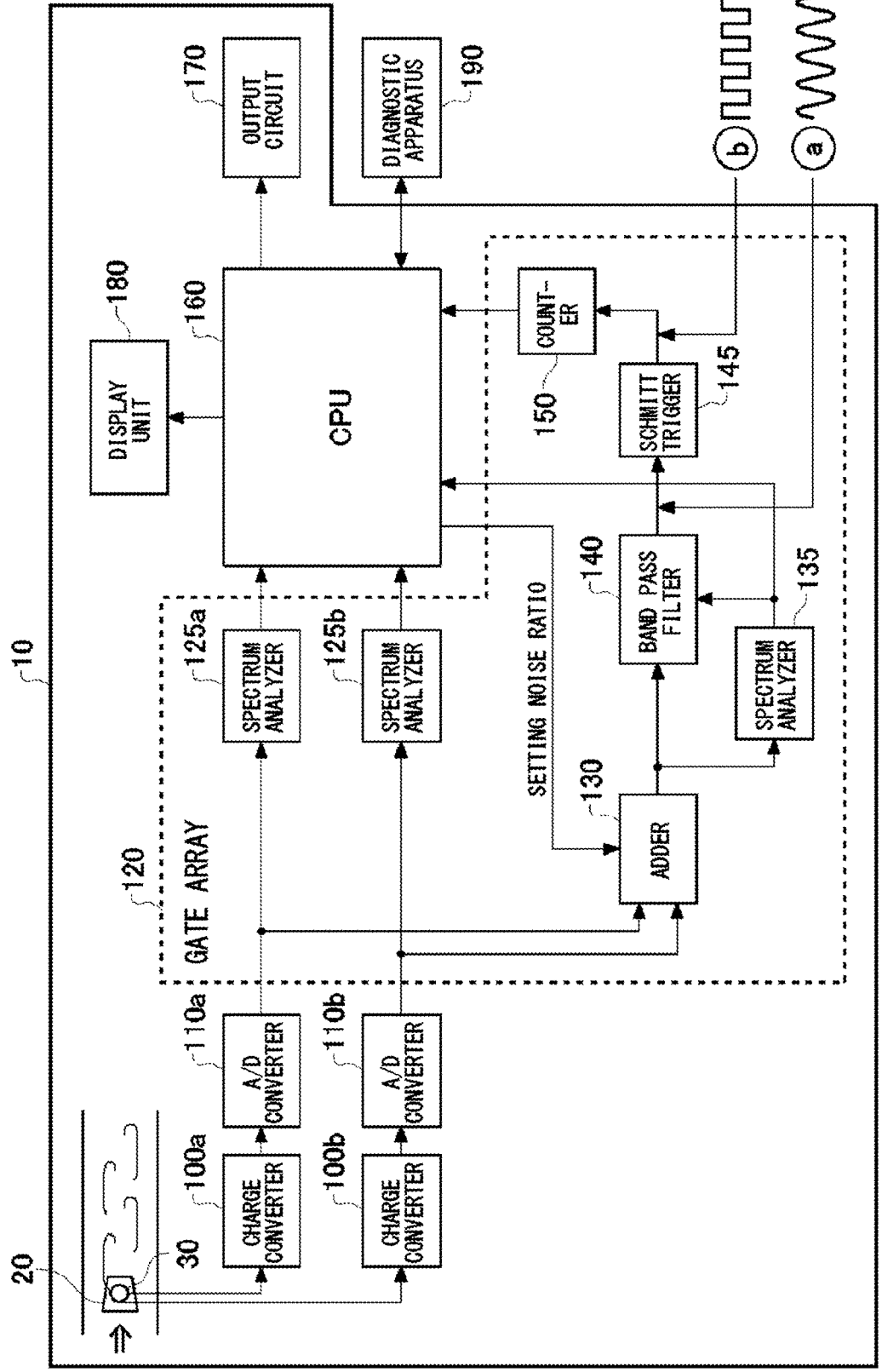
FIG. 1 illustrates a configuration of a measurement apparatus 5 according to the present embodiment.

FIG. 1 illustrates a configuration of a measurement apparatus 5 according to the present embodiment. The measurement apparatus 5 includes a vortex flowmeter 10 and a diagnostic apparatus 190. In the present embodiment, the vortex flowmeter 10 may employ the identical or similar configuration to the vortex flowmeter according to Patent Document 1 or 2. The vortex flowmeter 10 includes a vortex generator 20, a detection unit 30, one or more charge converters 100a to b (shown as a charge converter 100), one or more A/D converters 110a to b (shown as an A/D converter 110), a gate array 120, a CPU 160, an output circuit 170, and a display unit 180.

The vortex generator 20 is provided in the pipeline where the fluid to be measured flows. The detection unit 30 detects at least one detection signal according to the vortex (Karman vortex) generated by the vortex generator 20 when the fluid to be measured flowing in the pipeline hits the vortex generator 20. In the present embodiment, the detection unit 30 outputs the first detection signal and the second detection signal detected by two piezoelectric elements provided at two different positions on the vortex generator 20, as described below using FIG. 2. In the present embodiment, each piezoelectric element outputs, as a detection signal, the electric charge corresponding to the stress in the position where each piezoelectric element is provided in the vortex generator 20.

One or more charge converters 100 are connected to the detection unit 30 and convert into at least one detection signal in voltage form by converting the charge of the at least one detection signal into a voltage signal. In the present embodiment, the charge converter 100a converts the first detection signal to a voltage signal, and the charge converter 100b converts the second detection signal to a voltage signal. It should be noted that if the detection unit 30 outputs detection signals in voltage form or current form, the charge converters 100a to b are not necessary.

One or more A/D converters 110 are connected to the one or more charge converters 100, respectively, and convert the at least one detection signal in voltage form to at least one detection signal in a digital form. In the present embodiment, the A/D converter 110a converts the first detection signal to a digital signal, and the A/D converter 110b converts the second detection signal to a digital signal.

The gate array 120 is connected to one or more A/D converters 110. The gate array 120 includes one or more spectrum analyzers 125a to b (also shown as "spectrum analyzer 125"), an adder 130, a spectrum analyzer 135, a band pass filter 140, a Schmitt trigger 145, and a counter 150. It should be noted that in the present embodiment, these circuits are implemented in a single gate array 120, but at least one of each of these circuits may be implemented in another IC or the like, and at least some of them may be realized by executing a program in the CPU 160 or the like.

One or more spectrum analyzers 125 are connected to one or more A/D converters 110. One or more spectrum analyzers 125 perform spectrum analysis on the detection signals in a digital form input respectively from the one or more A/D converters 110. The spectrum analyzer 125a degrades the first detection signal into a plurality of frequency bands (for example, octave bands) that divide the entire frequency band (for example, 0-15 KHz) where the vortex frequency is to be measured, and outputs the signal intensity of each band. The spectrum analyzer 125b degrades the second detection signal into a plurality of frequency bands, and outputs the signal intensity of each band.

The adder 130 is connected to one or more A/D converters 110 and CPU 160. The adder 130 performs linear combination on two or more of the at least one detection signal using the noise ratio set by the CPU 160, and outputs it as a combined signal. As a result, the adder 130 cancels and removes the noise component included in the at least one detection signal, and the combined signal including the component of the vortex signal generated by the vortex (also shown as "vortex flow signal SQ") can be output.

The spectrum analyzer 135 is connected to the adder 130. The spectrum analyzer 135 performs spectrum analysis on the vortex flow signal SQ. The spectrum analyzer 135 degrades the vortex flow signal SQ into a plurality of frequency bands, and outputs the signal intensity of each band. The spectrum analyzer 135 then sets the band of frequencies in which the signal intensity is highest when the sensitivity curve proportional to the square of the frequency is used as a reference, among the plurality of frequency bands to the band pass filter 140 as the pass frequency band of the band pass filter 140. Herein, since the magnitude of the vibration caused by the Karman vortex is proportional to the square of the flow velocity (that is, proportional to the square of the vortex frequency), the spectrum analyzer 135 identifies the band of frequencies in which the signal intensity is maximum when the sensitivity curve proportional to the square of the frequency is used as a reference as the band of frequencies that contains the vortex signal generated by the Karman vortex. It should be noted that the spectrum analyzer 135 may use the method described in Patent Document 2 to identify the band of frequencies that contain the vortex signal generated by the Karman vortex.

The band pass filter 140 is connected to the adder 130 and the spectrum analyzer 135. The band pass filter 140 passes signal components in the vortex flow signal SQ within the pass frequency band set by the spectrum analyzer 135, and reduces or removes signal components outside the band. As a result, the band pass filter 140 outputs a band pass signal, among the vortex flow signals SQ, with a frequency corresponding to the number of Karman vortices generated in unit time, where the signal intensity is highest when the sensitivity curve proportional to the square of the frequency is used as a reference. As an example, this band pass signal is a signal that has an approximately sine waveform shape, as shown in the figure (a). In this manner, the spectrum analyzer 135 and the band pass filter 140 function as the extraction unit to extract, from the combined signal (vortex flow signal SQ), which is a linear combination of two or more of the at least one detection signal, the frequency component where the signal intensity is highest when the sensitivity curve proportional to the square of the frequency is used as a reference (that is, the frequency component corresponding to the vortex frequency).

The Schmitt trigger 145 is connected to the band pass filter 140. The Schmitt trigger 145 converts the vortex flow signals SQ passing through the band pass filter 140 into pulse signals having an identical frequency. The counter 150 is connected to the Schmitt trigger 145. The counter 150 measures the number of pulses per unit time (that is, frequency) by counting the pulse signals output by the Schmitt trigger 145. In this manner, the Schmitt trigger 145 and counter 150 function as a frequency measurement unit that measures the frequency of the frequency component according to the vortex frequency in the combined signal extracted by the spectrum analyzer 135 and band pass filter 140.

The CPU 160 is connected to the one or more spectrum analyzers 125, the spectrum analyzer 135 and the counter 150. The CPU 160 receives the spectrum analysis result of each detection signal from each spectrum analyzer 125, and functions as a noise ratio calculation unit for calculating the noise ratio based on the spectrum analysis result. The CPU 160 sets the calculated noise ratio to the adder 130.

The CPU 160 also receives from the counter 150 the number of pulses per unit time of the vortex flow signal SQ that has passed through the band pass filter 140. The CPU 160 functions as the flow rate calculation unit or the flow velocity calculation unit, and calculates the flow rate or the flow velocity from the vortex frequency represented by the number of pulses per unit time of the vortex flow signal SQ. The CPU 160 outputs the calculated flow rate or flow velocity to the output circuit 170 and the display unit 180. The CPU 160 also receives the spectrum analysis result by the spectrum analyzer 135 from the spectrum analyzer 135.

The output circuit 170 is connected to the CPU 160. The output circuit 170 receives the flow rate or flow velocity measured by the vortex flowmeter 10 from the CPU 160 and transmits the measured flow rate or flow velocity using a communication protocol specified by, for example, HART (registered trademark), BRAIN, Foundation Fieldbus (registered trademark), ISA 100.11a and so on to a host control apparatus or a human interface apparatus. The display unit 180 displays the measured flow rate or flow velocity received from the CPU 160.

The diagnostic apparatus 190 is connected to the vortex flowmeter 10. The diagnostic apparatus 190 may be realized by a dedicated hardware or a dedicated computer with a diagnostic function of the vortex flowmeter 10. Alternatively, the diagnostic apparatus 190 may be implemented by a computer such as a PC (personal computer), tablet computer, smartphone, workstation, server computer, or general-purpose computer. The diagnostic apparatus 190 may be realized by a cloud computing system, which is connected to the vortex flowmeter 10 via a network such as the Internet, and provides a cloud service that diagnoses the vortex flowmeter 10 and, in addition, optionally measures the flow rate or flow velocity using the vortex flowmeter 10, analyzes the measurement results, or controls the equipment according to the measurement results. When the diagnostic apparatus 190 is realized by a computer, the diagnostic apparatus 190 may provide various functions of the diagnostic apparatus 190 by executing a diagnostic program for the diagnostic apparatus 190 on the computer.

The diagnostic apparatus 190 receives and determines the magnitude of a signal component of each of the at least one target detection signal among the at least one detection signal, or the magnitude of at least one signal component of a combined signal that linearly combines two or more of the at least one detection signal, that is, the amplitude or signal intensity of the signal component and so on, and uses the determination results to diagnose the condition of the vortex flowmeter 10.

It should be noted that in the present embodiment, the diagnostic apparatus 190, which is a separate apparatus from the vortex flowmeter 10, is connected to the vortex flowmeter 10. Alternatively, the measurement apparatus 5 may be realized by integrating the diagnostic apparatus 190 and the vortex flowmeter 10. The diagnostic apparatus 190 may have components that duplicate those in the vortex flowmeter 10 that correspond to the components that generate the data needed to be diagnosed, such as at least some of the gate array 120 or at least some of the functions of the CPU 160, for example, in the vortex flowmeter 10.

Figure 2:
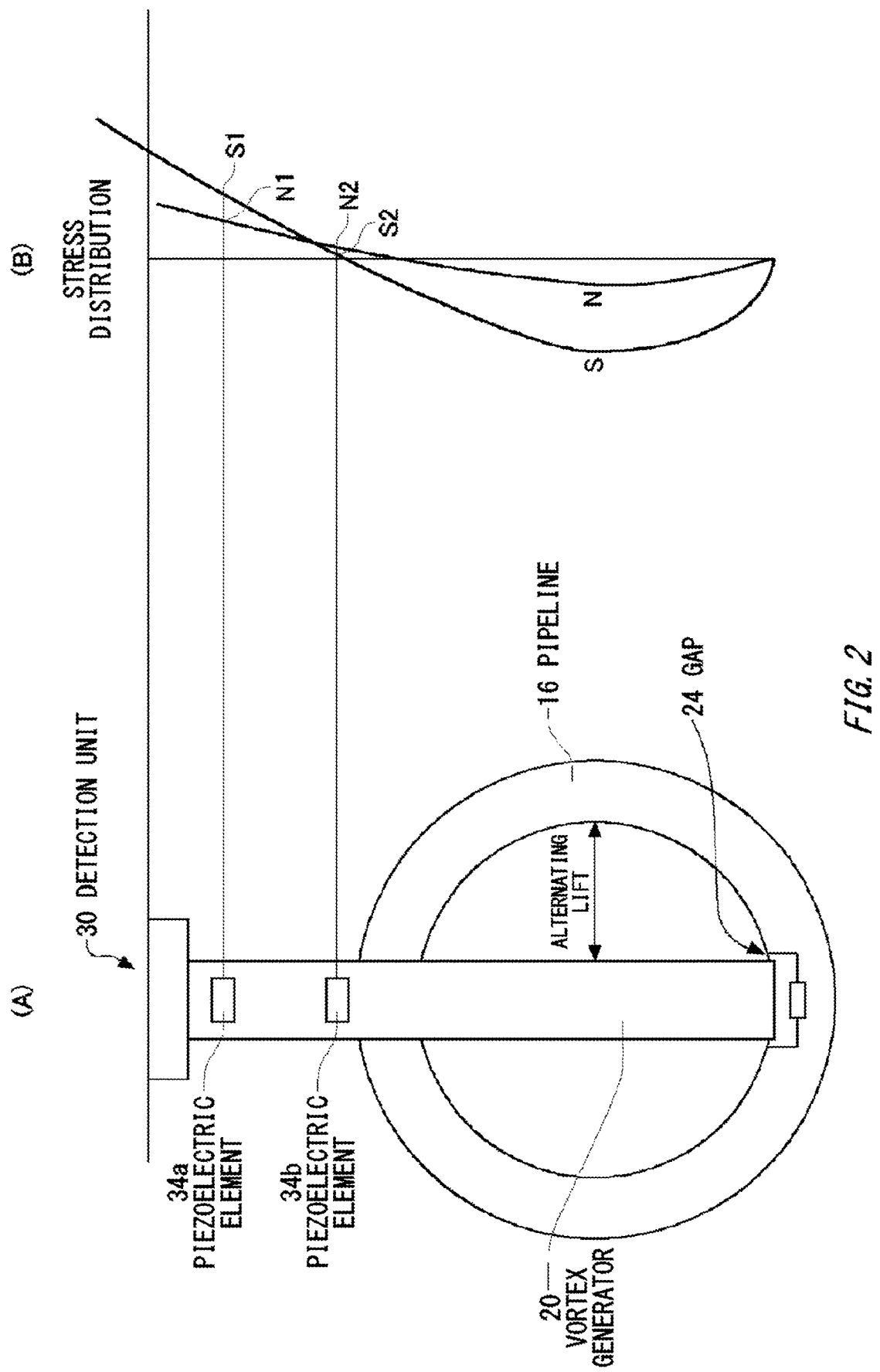
FIG. 2 illustrates one example of a structure for detecting the vibration generated by a vortex and a stress distribution in a vortex generator 20 in a vortex flowmeter 10 according to the present embodiment.

FIG. 2 illustrates an example of (A) the structure for detecting the vibration generated by the vortex and (B) the stress distribution in the vortex generator 20 in the vortex flowmeter 10 according to the present embodiment. In the present embodiment, the vortex generator 20 is arranged perpendicular to the pipeline 16. When the fluid to be measured flowing in the pipeline 16 hits the vortex generator 20, a Karman vortex is generated, which causes the vortex generator 20 to deform slightly due to the alternating lift force.

The detection unit 30 includes one or more piezoelectric elements 34a to b (shown as a piezoelectric element 34) provided in the vortex generator 20, on the outer side of the pipeline 16. In the present embodiment, the plurality of piezoelectric elements 34a to b are embedded or otherwise arranged at different positions in the extension direction (perpendicular to the pipeline 16) of the vortex generator 20. The first piezoelectric element 34a is arranged in a position, with respect to the second piezoelectric element 34b, further away from the pipeline 16. Each piezoelectric element 34 detects the slight deformation of the vortex generator 20 in a place where each piezoelectric element 34 is provided, and outputs it as an electric charge signal. Since the number of Karman vortices generated in a unit time is proportional to the flow velocity, the vortex flowmeter 10 can measure the flow rate of the fluid to be measured using the detection signal of the detection unit 30.

It should be noted that the detection unit 30 may have a sensor that detects the slight deformation or vibration of the vortex generator 20 by other methods instead of the piezoelectric element 34. Instead of being arranged in the vortex generator 20, the piezoelectric element 34 may be arranged downstream of the vortex generator 20 to receive the vibrations caused by the Karman vortex.

Herein, each piezoelectric element 34 detects not only the signal by the Karman vortex, but also the noise generated by the vibration of the pipeline 16. FIG. 2(B) shows an example of the distribution (stress distribution) of the stress due to the Karman vortex and the stress due to noise such as vibration at each position in the extension direction of the vortex generator 20 shown in FIG. 2(A). S in the figure indicates the stress distribution due to the Karman vortex, and N indicates the stress distribution of noise. As shown in the figure, these stress distributions are quite different.

The first piezoelectric element 34a outputs the first detection signal, which is a combination of the vortex signal S1 corresponding to the stress caused by the Karman vortex and the noise N1 corresponding to the stress caused by the noise, at the position where the first piezoelectric element 34a is provided. The second piezoelectric element 34b outputs the second detection signal, which is a combination of the vortex signal S2 corresponding to the stress caused by the Karman vortex and the noise N2 corresponding to the stress caused by the noise at the position where the second piezoelectric element 34b is provided.

Herein, assuming that the first detection signal is Q1 and the second detection signal is Q2, these signals can be expressed by the following Expressions (1) and (2).

[Expression (1)]

$$Q1 = S1 + N1 \tag{1}$$

[Expression (2)]

$$Q2 = S2 + N2 \tag{2}$$

Herein, S1 and S2 are vortex signal components, and N1 and N2 are noise components. Since the ratio S1/S2 of the vortex signal component in the first detection signal and second detection signal differs from the ratio N1/N2 of the noise component as shown in FIG. 2(B), the noise component can be canceled out by multiplying Expression (2) by the noise ratio (N1/N2) and subtracting it from Expression (1) to acquire the vortex flow signal SQ shown in Expression (3) below.

[Expression (3)]

$$\begin{aligned} SQ &= Q1 - (N1/N2) \times Q2 \\ &= S1 + N1 - (N1/N2)(S2 + N2) \\ &= S1 - (N1/N2) \times S2 \\ &= S1 - \gamma \times S2 \end{aligned} \tag{3}$$

Herein, if the noise ratio $\gamma = N1/N2$ is a known constant, the vortex flow signal SQ will contain no noise component, but only vortex signal components S1 and S2. The CPU 160 of the present embodiment calculates the noise ratio $\gamma$ based on the spectrum analysis results of each detection signal received from each spectrum analyzer 125.

Figure 3:
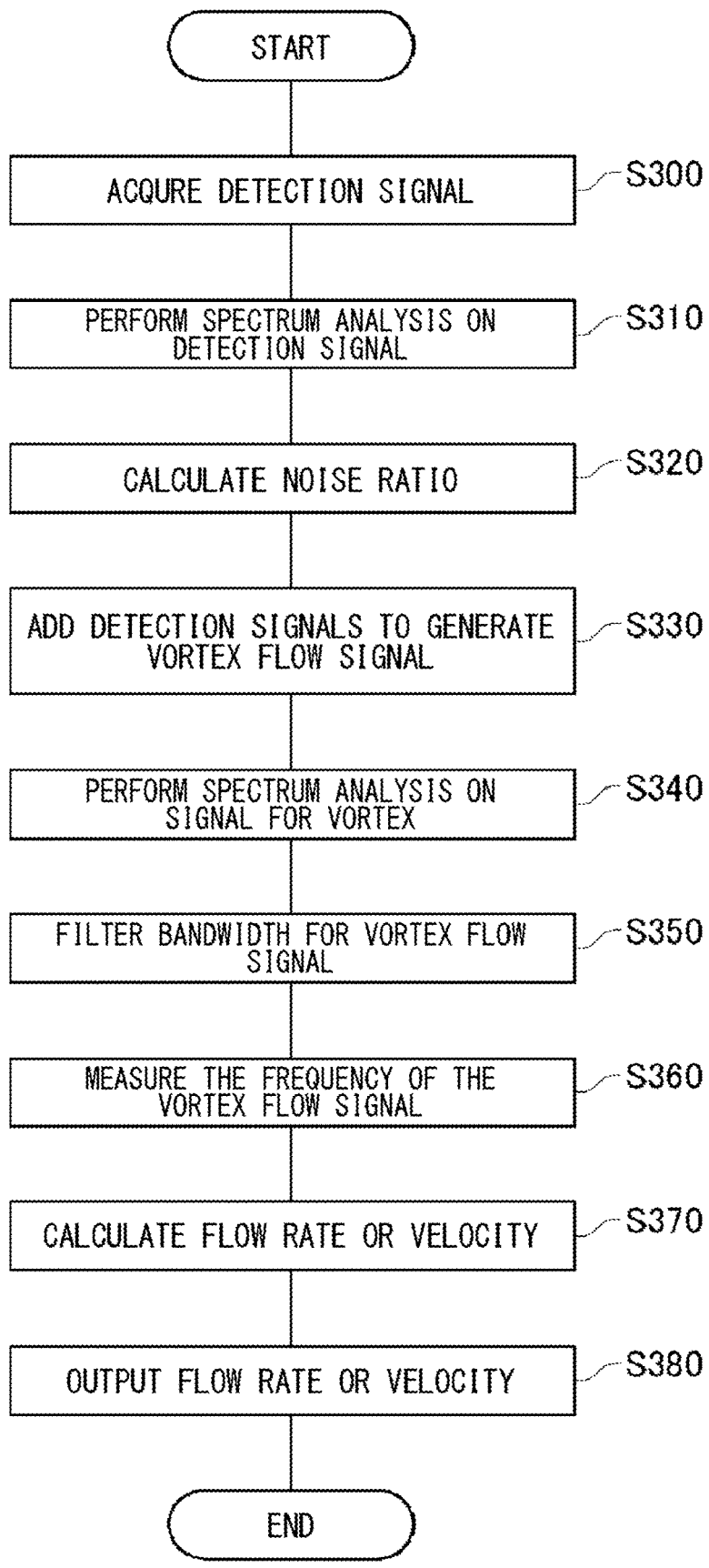
FIG. 3 illustrates an operation flow of the vortex flowmeter 10 according to the present embodiment.

FIG. 3 illustrates an operation flow of the vortex flowmeter 10 according to the present embodiment. In step 300 (S300), the vortex flowmeter 10 acquires at least one detection signal using the detection unit 30, each charge converter 100, and each A/D converter 110.

In S310, each spectrum analyzer 125 performs a spectrum analysis on the detection signal corresponding to that spectrum analyzer 125. Each of the spectrum analyzers 125 may employ a configuration, similar to the band amplifiers 23 and 24 described in Patent Document 2, where the vortex flowmeter 10 has a plurality of amplifiers AMP 1 to n that are associated one-to-one to a plurality of frequency bands with the target entire frequency band divided, and each amplifier AMP amplifies the signal components in the assigned frequency band of the detection signal, and reduces or removes the signal components outside the band. This allows the spectrum analyzer 125 to divide the detection signal for each different frequency band. The spectrum analyzer 125 then calculates the magnitude of the signal component of the detection signal for each frequency band. Alternatively, each spectrum analyzer 125 may calculate the magnitude of the detection signal for each frequency band by transforming the detection signal into a signal in the frequency domain by Fourier transforming it.

In S320, the CPU 160 calculates the noise ratio $\gamma$ based on the spectrum analysis results by each spectrum analyzer 125. The CPU 160 may calculate the noise ratio $\gamma$ in a similar way as the calculation method 26 described in Patent Document 2.

The CPU 160 of the present embodiment considers the frequency band, in which among the signal components of each frequency band of the detection signal from the piezoelectric element 34a farthest from the pipeline 16 among the one or more piezoelectric elements 34, the signal component with the next highest signal intensity except for the signal component with the highest signal intensity when the sensitivity curve proportional to the square of the frequency is used as a reference is included, as the frequency band where noise is superimposed. The CPU 160 then calculates the ratio of the first detection signal and the second detection signal in the frequency band where noise is superimposed as the noise ratio $\gamma$. Alternatively, the CPU 160 may calculate the noise ratio γ by considering any of the other frequency bands except for the signal component with the highest signal intensity when the sensitivity curve proportional to the square of the frequency is used as a reference, as the frequency band where noise is superimposed.

The CPU 160 sets the calculated noise ratio γ to the adder 130. It should be noted that to identify the frequency band where noise is superimposed, the CPU 160 may identify the frequency band where noise is superimposed by comparing the magnitude of the signal component of each frequency band of the detection signal with the magnitude of the value divided by the square of the center frequency of that frequency band. Instead of updating the noise ratio γ every time a new detection signal is acquired, the CPU 160 may update the noise ratio γ, for example, every certain period or the like.

In S330, the adder 130 linearly combines two or more of the plurality of the detection signals by weighted summing using the noise ratio γ to produce the vortex flow signal SQ, which contains the components of the vortex signal. In the present embodiment, the adder 130 generates the vortex flow signal SQ by multiplying the second detection signal Q2 by −γ and adding it to the first detection signal Q1, as shown in Expression (3).

In S340, the spectrum analyzer 135 performs a spectrum analysis of the vortex flow signal SQ to calculate the signal intensity of each band, which decomposes the vortex flow signal SQ into a plurality of frequency bands. The spectrum analyzer 135 then sets the band of frequencies with the highest signal intensity when the sensitivity curve proportional to the square of the frequency is used as a reference among the plurality of frequency bands to the band pass filter 140 as the pass frequency band of the band pass filter 140. Herein, the spectrum analyzer 135 may use the band with the highest value acquired by dividing the signal intensity of each band by the square of the center frequency of that band as the pass frequency band of the band pass filter 140.

In S350, the band pass filter 140 passes the signal components in the vortex flow signal SQ within the pass frequency band set by the spectrum analyzer 135, and reduces or removes the signal components outside the band. In S360, the Schmitt trigger 145 and counter 150 measure the frequency (vortex frequency) of the vortex flow signal SQ that has passed through the band pass filter 140.

In S370, the CPU 160 calculates the flow rate or flow velocity from the frequency of the vortex flow signal SQ measured by the Schmitt trigger 145 and the counter 150. In S380, the output circuit 170 and the display unit 180 output and display the calculated flow rate or flow velocity.

In the vortex flowmeter 10 shown above, the vortex flow signal SQ has been generated by linearly combining the two detection signals Q1 and Q2 with the noise ratio γ. Alternatively, the vortex flowmeter 10 may generate the vortex flow signal SQ by linearly combining three or more detection signals to cancel out noise components.

The vortex flowmeter 10 may be used to measure flow rate or flow velocity using the detection signal from a single piezoelectric element 34. In this case, the vortex flowmeter 10 may have one set of piezoelectric element 34, charge converter 100, and A/D converter 110, and may not have spectrum analyzer 125 and adder 130. The spectrum analyzer 135 and band pass filter 140 input one detection signal and output a band pass signal with a frequency corresponding to the number of Karman vortices generated in unit time, where the signal intensity is highest when the sensitivity curve proportional to the square of the frequency is used as a reference among the detection signals. The Schmitt trigger 145 and the counter 150 measure the frequency of the detection signal that has passed through the band pass filter 140. In such a configuration, the vortex flowmeter 10 does not cancel out the noise component of the detection signal. However, if the detection signal contains a sufficiently large vortex signal component compared to the noise component, the vortex flowmeter 10 can measure the flow rate or flow velocity of the fluid to be measured using a configuration with only one piezoelectric element 34.

Figure 4:
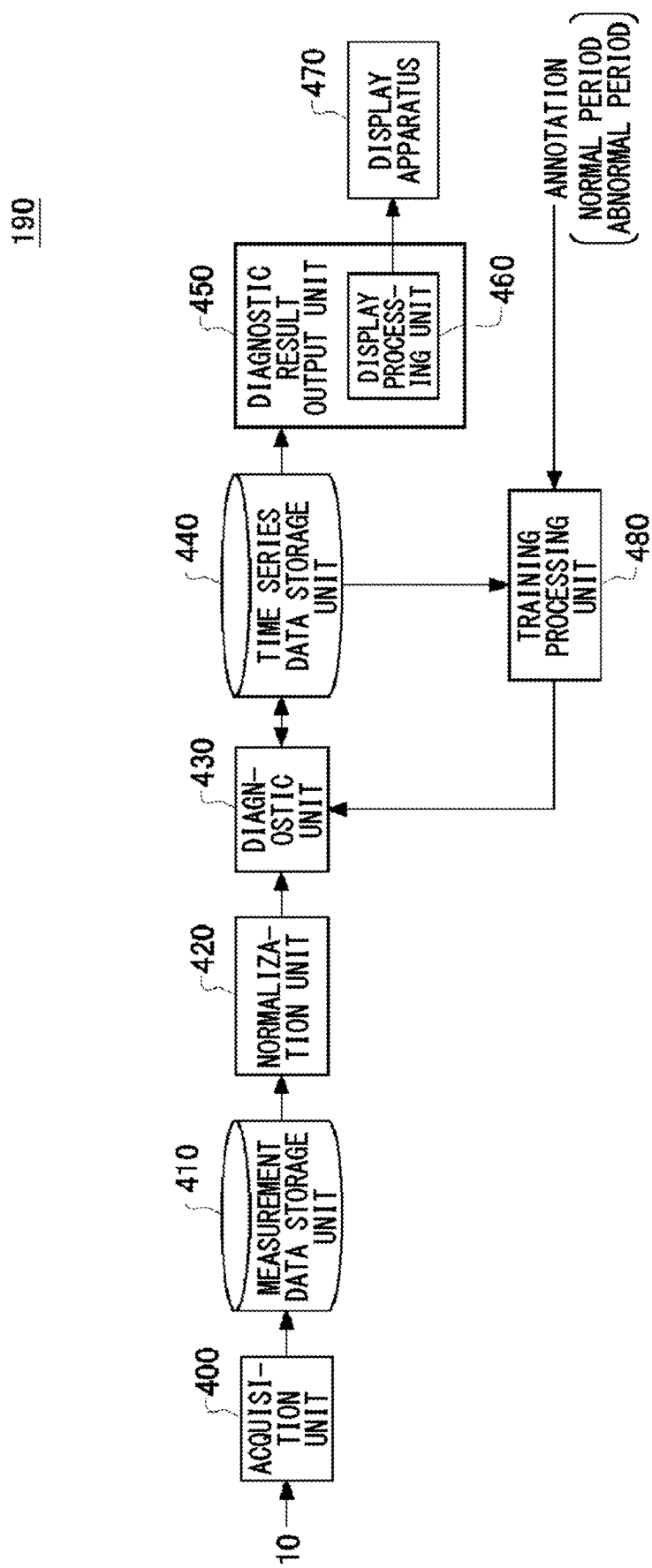
FIG. 4 illustrates a configuration of a diagnostic apparatus 190 according to the present embodiment.

FIG. 4 illustrates a configuration of the diagnostic apparatus 190 according to the present embodiment. The diagnostic apparatus 190 has an acquisition unit 400, a measurement data storage unit 410, a normalization unit 420, a diagnostic unit 430, a time series data storage unit 440, a diagnostic result output unit 450, a display apparatus 470, and a training processing unit 480.

The acquisition unit 400 is connected to the CPU 160 of the vortex flowmeter 10. The acquisition unit 400 acquires measurement data including the magnitude of the signal component of the combined signal (vortex flow signal SQ) and the vortex frequency measured by the vortex flowmeter 10 from the vortex flowmeter 10. Herein, the diagnostic apparatus 190 may acquire the signal intensity of the frequency band in which the vortex flow signal SQ is contained by acquiring the spectrum analysis result of the vortex flow signal SQ by the spectrum analyzer 135 via the CPU 160.

The measurement data storage unit 410 is connected to the acquisition unit 400 and stores the measurement data acquired by the acquisition unit 400. The normalization unit 420 is connected to the measurement data storage unit 410. The normalization unit 420 normalizes the magnitude of the signal component of the vortex flow signal SQ included in the measurement data stored in the measurement data storage unit 410 by the vortex frequency. Herein, as mentioned earlier, the magnitude of the oscillation caused by the Karman vortex is proportional to the square of the flow velocity, and therefore, the magnitude of the signal component of the vortex flow signal SQ is proportional to the square of the vortex frequency. Therefore, the normalization unit 420 converts the magnitude of the signal component of the vortex flow signal SQ to the magnitude of the signal component independent of the vortex frequency by dividing it by the square of the vortex frequency.

The diagnostic unit 430 is connected to the normalization unit 420. The diagnostic unit 430 diagnoses the condition of the vortex flowmeter 10 based on the determination result acquired by comparing the normalized magnitude of the signal component of the vortex flow signal SQ with a threshold. The diagnostic unit 430 acquires the transition of the normalized magnitude of the signal component of the vortex flow signal SQ from the time series data storage unit 440, and uses the transition to predict the condition of the vortex flowmeter 10 in the future.

The time series data storage unit 440 is connected to the diagnostic unit 430. The time series data storage unit 440 stores the time series data of the normalized magnitude of the signal components of the vortex flow signal SQ and the diagnostic results of the condition of the vortex flowmeter 10.

The diagnostic result output unit 450 is connected to the time series data storage unit 440. The diagnostic result output unit 450 outputs the time series data including the diagnostic result of the condition of the vortex flowmeter 10 stored in the time series data storage unit 440. The diagnostic result output unit 450 may output time series data including the diagnostic result of the condition of the vortex flowmeter 10 to a higher-level apparatus that controls or manages, for example, a plant in which the vortex flowmeter 10 is arranged. The diagnostic result output unit 450 may also include a display processing unit 460. The display processing unit 460 performs processing (such as generation of a display screen or web page) for displaying the time series data including the diagnostic results of the condition of the vortex flowmeter 10 on the display apparatus 470. The display apparatus 470 is connected to the diagnostic result output unit 450 and displays the display screen and other information generated by the display processing unit 460. The display apparatus 470 is provided outside the diagnostic apparatus 190 (for example, at a location away from the diagnostic apparatus 190) and may receive and display the display screen and other information generated by the display processing unit 460 via a network.

The training processing unit 480 is connected to the time series data storage unit 440. The training processing unit 480 uses the history of the normalized magnitudes of the signal components of the vortex flow signal SQ stored in the time series data storage unit 440 to generate, by learning, the determination criteria, including the thresholds and so on, used by the diagnostic unit 430. In the present embodiment, the training processing unit 480 adds normal or abnormal annotations to the data at each time point in the time series data stored by the time series data storage unit 440 upon receiving an input of at least one period in which the vortex flowmeter 10 was normal (normal period) or abnormal (abnormal period). Then, the training processing unit 480 generates the determination criteria by learning using the time series data with annotations added.

Figure 5:
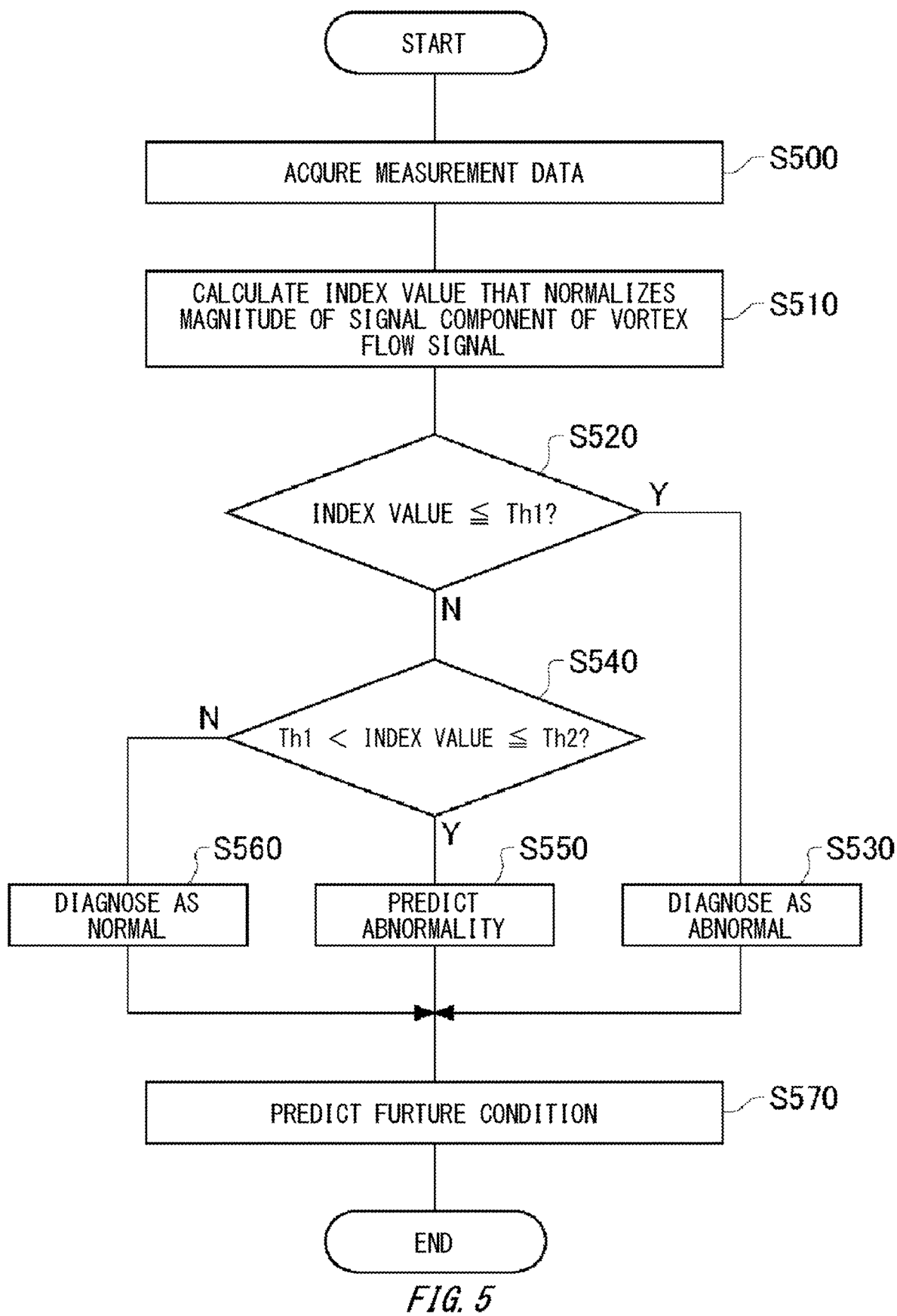
FIG. 5 illustrates a diagnostic flow of the vortex flowmeter 10 performed by the diagnostic apparatus 190 according to the present embodiment.

FIG. 5 illustrates a diagnostic flow of the vortex flowmeter 10 with the diagnostic apparatus 190 according to the present embodiment. In S500, the acquisition unit 400 acquires measurement data including the magnitude of the signal component of the vortex flow signal SQ and the vortex frequency measured by the vortex flowmeter 10 from the vortex flowmeter 10 and stores it in the measurement data storage unit 410. The acquisition unit 400 may acquire the measurement data sequentially in real time from the vortex flowmeter 10, or it may acquire the measurement data for a certain period in the past stored in the vortex flowmeter 10 at once.

In S510, the normalization unit 420 calculates the index value of the magnitude of the signal component of the vortex flow signal SQ in the measurement data stored in the measurement data storage unit 410, normalized by the vortex frequency. Such an index value indicates the sensitivity of the vortex flowmeter 10 in the vortex flow signal SQ, independent of the vortex frequency. It should be noted that the magnitude of the signal component of the vortex flow signal SQ varies depending on the density of the fluid to be measured. Therefore, if the density of the fluid to be measured changes, the normalization unit 420 may further normalize the magnitude of the signal component of the vortex flow signal SQ by the density of the fluid to be measured.

In S520, the diagnostic unit 430 determines whether the index value indicating the normalized magnitude of the signal component of the vortex flow signal SQ is less than or equal to the first threshold Th1. Then, the diagnostic unit 430 diagnoses that the vortex flowmeter 10 is abnormal in S530 based on the determination result that the index value is less than the first threshold ("Y" in S520). The diagnostic result output unit 450 outputs the diagnostic result that the vortex flowmeter 10 is abnormal.

In S540, the diagnostic unit 430 determines whether the index value indicating the normalized magnitude of the signal component of the vortex flow signal SQ exceeds than the first threshold Th1 and is less than or equal to the second threshold Th2. Then, based on the determination result that the index value exceeds the first threshold Th1 and is less than or equal to the second threshold Th2 ("Y" in S540), the diagnostic unit 430 does not diagnose that the vortex flowmeter 10 is abnormal at the current moment, but predicts that the vortex flowmeter 10 will be abnormal later, in S550. This condition indicates a condition that the vortex flowmeter 10 is not abnormal at the current moment, but that maintenance and inspection of the vortex flowmeter 10 is recommended. The diagnostic result output unit 450 outputs the prediction result that the vortex flowmeter 10 later becomes abnormal.

If the index value exceeds the second threshold Th2 ("N" in S540), the diagnostic unit 430 diagnoses that the vortex flowmeter 10 is normal in S560. The diagnostic result output unit 450 outputs the diagnostic result that the vortex flowmeter 10 is normal.

In S570, the display processing unit 460 predicts the future condition of the vortex flowmeter 10 using the time series data of the index values stored in the time series data storage unit 440. This prediction method is described below in relation to FIG. 7.

Figure 6:
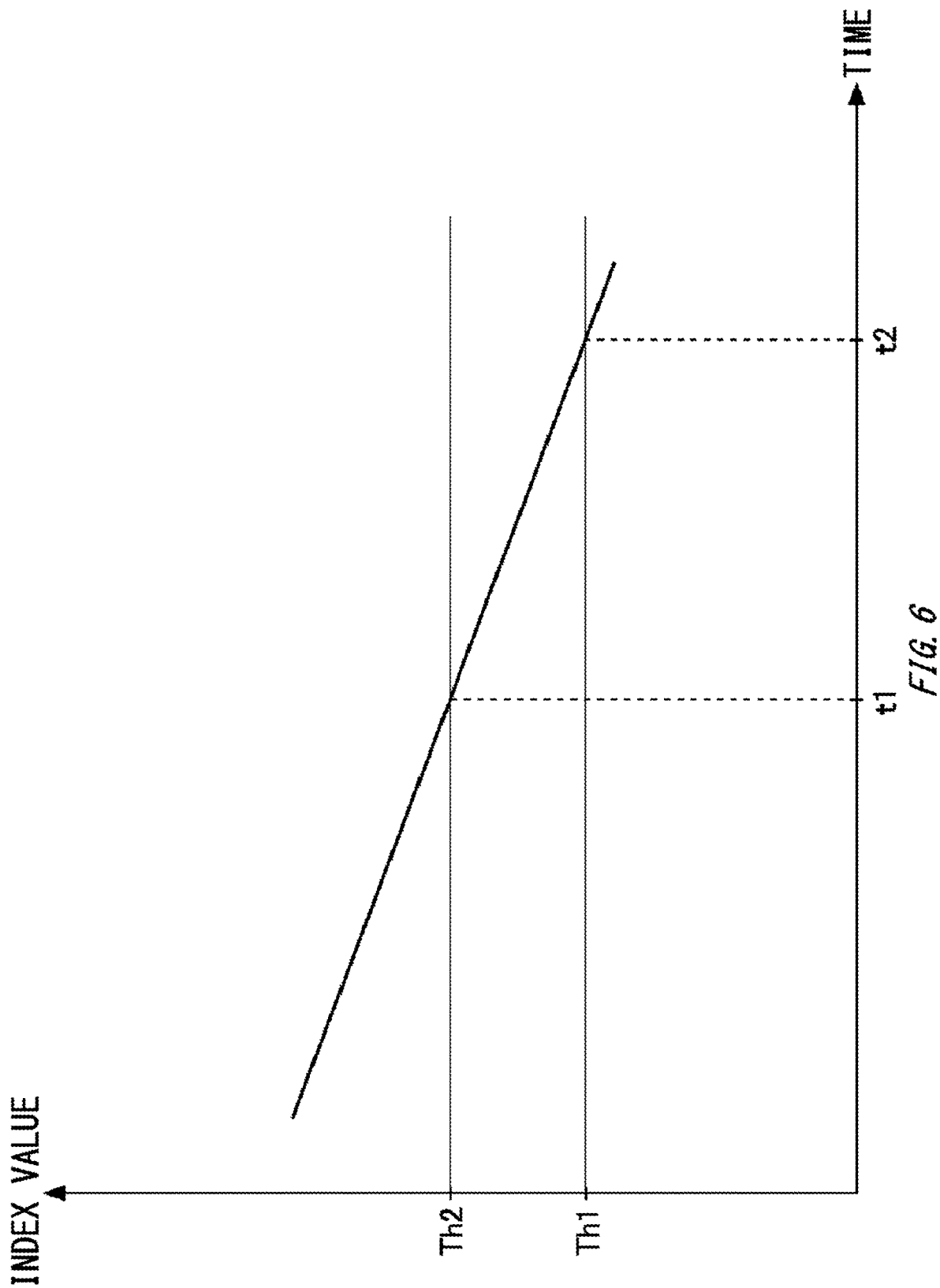
FIG. 6 illustrates a graph showing a diagnostic case of the vortex flowmeter 10 performed by the diagnostic apparatus 190 according to the present embodiment.

FIG. 6 illustrates a graph showing a diagnostic case of the vortex flowmeter 10 by the diagnostic apparatus 190 according to the present embodiment. The present figure takes the elapse of time on the horizontal axis and the index value, which indicates the normalized magnitude of the signal component of the vortex flow signal SQ, on the vertical axis, and shows the change in the index value with the elapse of time. The display processing unit 460 may use graphs such as the one shown in this figure to display changes in the index values to be diagnosed of the vortex flowmeter 10.

In the present embodiment, as shown in FIG. 2, there is provided a gap 24 between the vortex generator 20 and the pipeline 16. When foreign body clogs the gap 24, the vibration of the vortex generator 20 is suppressed and the amplitude of each detection signal decreases, and eventually the amplitude of the vortex flow signal SQ output from the band pass filter 140 becomes less than the amplitude detectable by the Schmitt trigger 145, and the vortex flowmeter 10 is unable to measure the vortex frequency.

As shown in this figure, the index value exceeds the second threshold Th2 when the vortex flowmeter 10 is normal, but gradually decreases as the clogging progresses and becomes less than the second threshold Th2 at time t1. As the clogging progresses further, the index value decreases further and falls to the first threshold Th1 or less at time t2.

In the present embodiment, the boundary of the index value at which the vortex flowmeter 10 can measure the vortex frequency is set as the first threshold Th1. It should be noted that the first threshold Th1 may be a value with some margin to prevent the failure to diagnose an abnormality even though the vortex frequency cannot be measured anymore. This allows the diagnostic apparatus 190 to diagnose that the condition of the vortex flowmeter 10 is abnormal if the vortex flowmeter 10 is unable to measure the flow rate or flow velocity due to clogging of the gap 24 with foreign body.

In the present embodiment, the diagnostic unit 430 uses the second threshold Th2, which is larger than the first threshold Th1, to predict the occurrence of an abnormality in the future when the index value exceeds the first threshold Th1 but is less than or equal to the second threshold Th2. This allows the diagnostic apparatus 190 to make a diagnosis recommending maintenance and inspection of the vortex flowmeter 10 before the vortex flowmeter 10 is no longer capable of measuring flow rate or flow velocity, and encourages the user to plan for maintenance and inspection.

It should be noted that in Patent Document 2, the clogging is predicted using the result of determining the magnitude of the signal ratio SR (=S1/S2) instead of the linear combination of the vortex signal component S1 in the first detection signal and the vortex signal component S2 in the second detection signal (paragraphs 0017-0018, 0039-0044 and so on). As described above, since the vibration of the vortex generator 20 is suppressed due to foreign body clogging the gap 24 and so on, and the amplitude of each detection signal is reduced, the amplitude of both vortex signal components S1 and S2 is reduced by the clogging. Therefore, the signal ratio SR, which is calculated by dividing the vortex signal component S1 by the vortex signal component S2, is less sensitive to clogging compared to the index value of the present embodiment because the decrease in amplitude of the vortex signal components S1 and S2 cancels out to some extent.

In contrast, in the present embodiment, the diagnosis is performed using the magnitude of the vortex flow signal SQ, which is a linear combination of the vortex signal components S1 and S2, normalized by the vortex frequency, so that the condition of the vortex flowmeter 10 can be diagnosed with better sensitivity.

It should be noted that in the present embodiment, the diagnostic unit 430 compares the magnitude of the signal component of the vortex flow signal SQ normalized by the vortex frequency with a threshold. Alternatively, the diagnostic unit 430 may compare the un-normalized signal component of the vortex flow signal SQ with a threshold depending on the vortex frequency, that is, for example, a threshold obtained by multiplying the first or second threshold by the square of the vortex frequency, thereby effectively comparing the magnitude of the signal component of the vortex flow signal SQ normalized by the vortex frequency with the first or second threshold.

Figure 7:
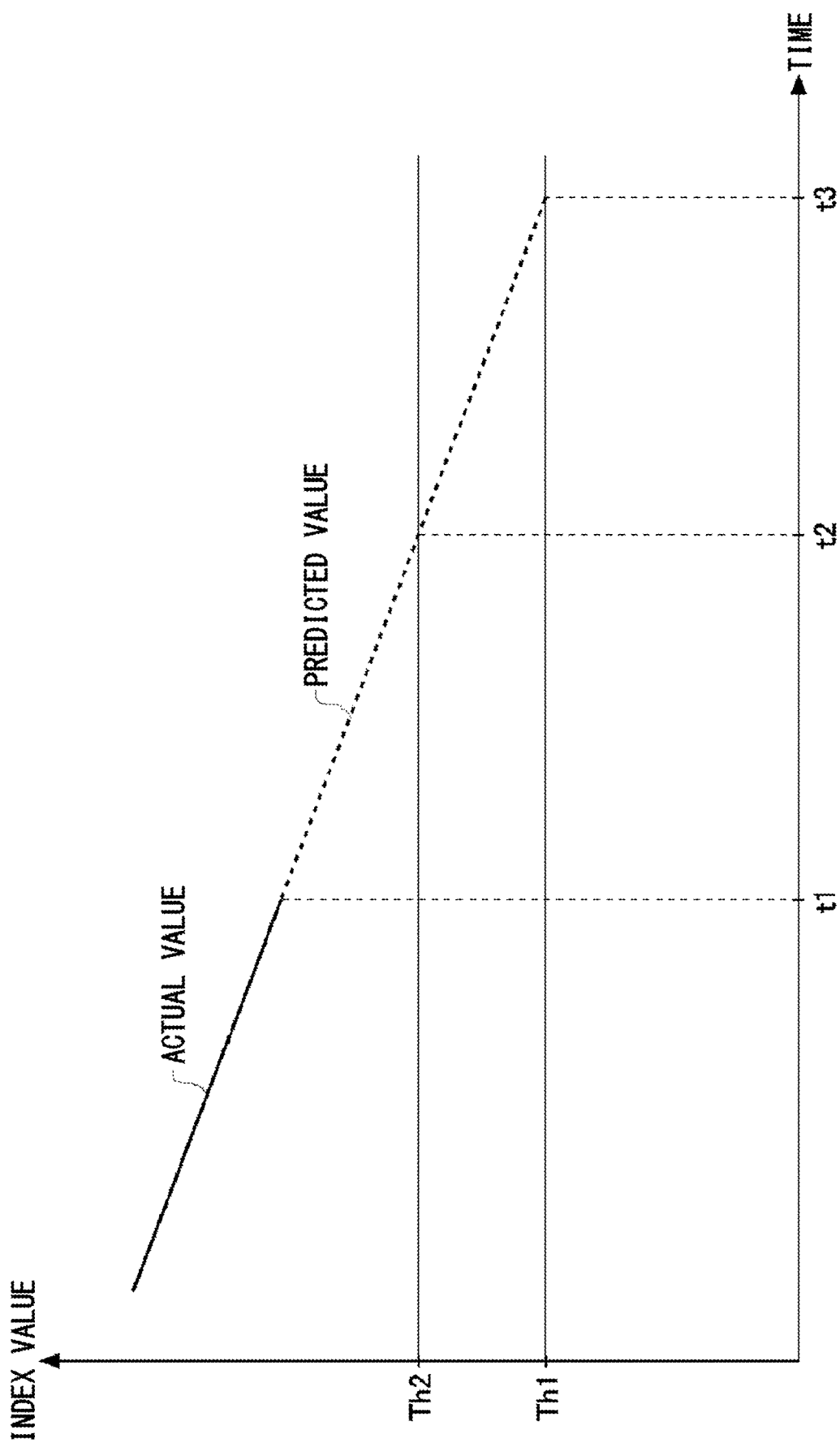
FIG. 7 illustrates a graph showing a prediction example of a future condition of the vortex flowmeter 10 performed by the diagnostic apparatus 190 according to the present embodiment.

FIG. 7 illustrates a graph showing a prediction example of a future condition of a vortex flowmeter 10 by the diagnostic apparatus 190 according to the present embodiment. The present figure takes the elapse of time on the horizontal axis and the index value, which indicates the normalized magnitude of the signal component of the vortex flow signal SQ, on the vertical axis, and shows the change in the index value with the elapse of time.

In S570 of FIG. 5, the diagnostic unit 430 predicts at least one of the time point t2 at which the index value decreases to the second threshold Th2 or the time point t3 at which the index value decreases to the first threshold Th1, using the time series data of the index value up to the current time t1 stored in the time series data storage unit 440. As an example, the diagnostic unit 430 extends the trend of the index value over a predetermined period (for example, one week, one month and so on) ending with the current time t1, and calculates the time point t2 or t3 at which the extended trend reaches the second threshold Th2 or the first threshold Th1. Herein, the diagnostic unit 430 may approximate the trend of the index values by a linear function of the elapse of time. This allows the diagnostic unit 430 to perform predictions that are suitable for the case where an approximately constant amount of foreign body accumulates per unit time as time elapses. Alternatively, the diagnostic unit 430 may predict the trend of the index value using the result of fitting the change in the index value over a predetermined period to another function.

The diagnostic result output unit 450 outputs at least one of the prediction time point t2 at which maintenance and inspection of the vortex flowmeter 10 is recommended or the prediction time point t3 at which the vortex flowmeter 10 is diagnosed as abnormal, or the length of period until these prediction time points. The display processing unit 460 may output the prediction results for the time point t2 and time point t3 by displaying the trend graph illustrated in FIG. 7 on the display apparatus 470.

According to the diagnostic apparatus 190 shown above, it is possible to predict the time point t2 at which maintenance and inspection will be recommended in the future or the time point t3 at which the vortex flowmeter 10 will be diagnosed as abnormal in the future, and to notify the user of the diagnostic apparatus 190 of the prediction results well before these events occur. This allows the diagnostic apparatus 190 to schedule maintenance and inspection of the vortex flowmeter 10 at a more favorable timing, thereby increasing the availability of the vortex flowmeter 10.

Figure 8:
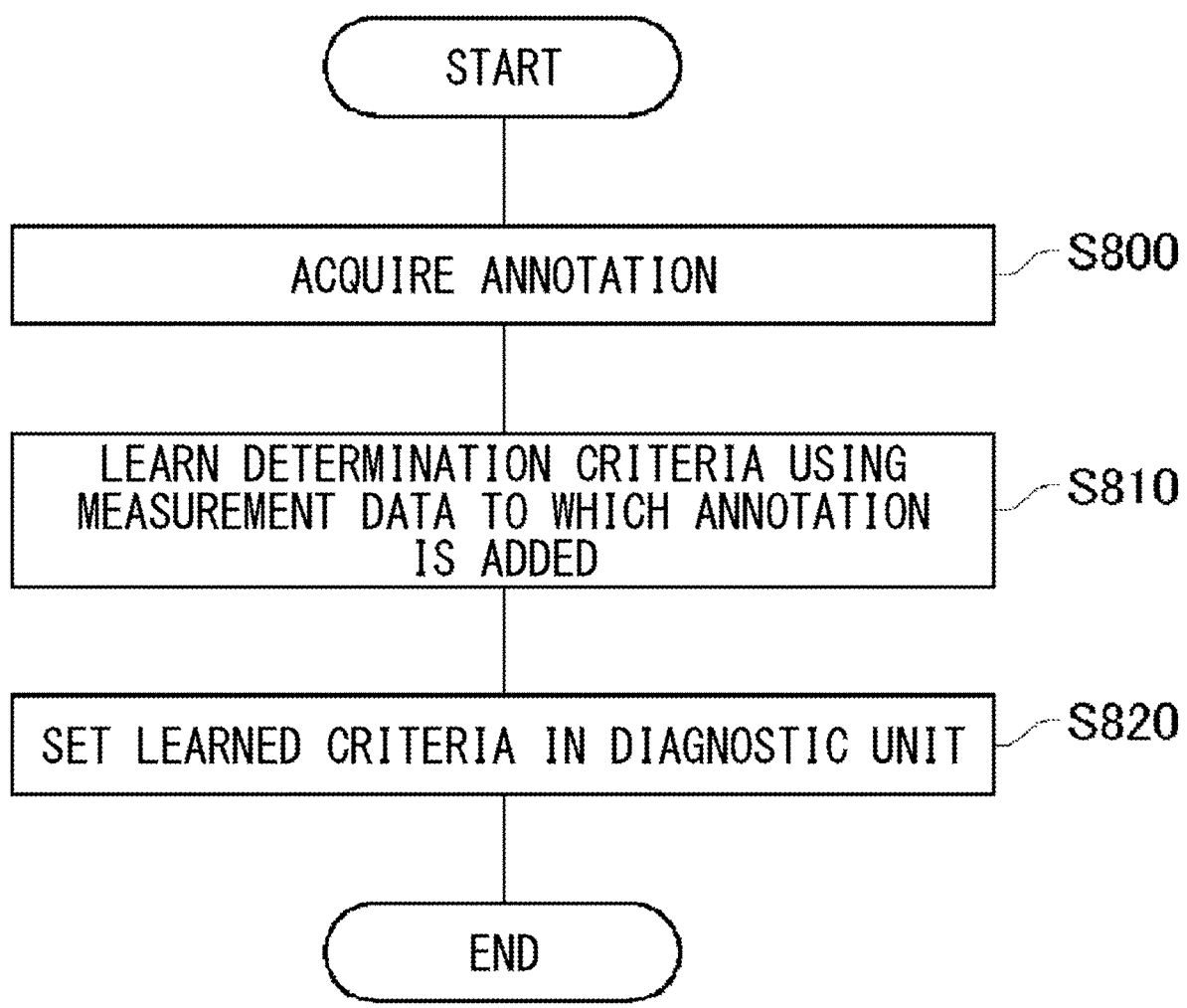
FIG. 8 illustrates a training processing flow of the diagnostic apparatus 190 according to the present embodiment.

FIG. 8 illustrates a training processing flow of the diagnostic apparatus 190 according to the present embodiment. In S800, the training processing unit 480 acquires the annotations for the time series data stored in the time series data storage unit 440. This annotation indicates whether the index value is normal or abnormal for at least some time points in the time series data stored in the time series data storage unit 440. The training processing unit 480 of the present embodiment may input at least one of a normal period (index value>first threshold Th1) or an abnormal period (index value≤first threshold Th1) of the vortex flowmeter 10 to be used for learning the first threshold Th1, and add a tag indicating normal to the index value at each time point in the normal period and add a tag indicating abnormal to the index value at each time point in the abnormal period.

For example, if the vortex flowmeter 10 is inspected multiple times through periodic or temporary inspections, and the vortex flowmeter 10 is normal at the time of one inspection and also normal at the time of the next inspection, the vortex flowmeter 10 can be considered to have been normal for the period between these inspections. Therefore, the training processing unit 480 may receive annotation input indicating that the vortex flowmeter 10 was normal during the period between these inspections.

If the vortex flowmeter 10 is normal at one time point of inspection but abnormal at the next time point of inspection, it can be considered that the vortex flowmeter 10 changed from normal to abnormal at some time point between the previous and subsequent inspections, and that the vortex flowmeter 10 was abnormal for the period until the subsequent inspection. Therefore, the training processing unit 480 may receive input of annotations indicating that the vortex flowmeter 10 was abnormal during this period. Herein, the training processing unit 480 may determine the time point that is the boundary between normal and abnormal as the time point when the time between the previous and subsequent inspections is divided by a predetermined ratio, or as the time point before a predetermined period based on the inspection behind.

Similarly, the training processing unit 480 may input at least one of the normal periods of the vortex flowmeter 10 (index value>second threshold Th2) or the periods when maintenance and inspection of the vortex flowmeter 10 is at least recommended (index value≤second threshold Th2), and add a tag to the index value at each time point for learning the second threshold Th2.

In S810, the training processing unit 480 learns the determination criteria for determining the normal or abnormal condition of the vortex flowmeter 10 using the measurement data to which the annotation is added. The training processing unit 480 collects at least one index value that is added with a tag as normal and index value that is added with a tag as abnormal and uses them as training data to generate the first threshold Th1 and second threshold Th2 shown in FIG. 6 by learning.

As an example, the training processing unit 480 may generate the first threshold Th1, which is the boundary for classifying an index value as normal or abnormal, by learning using a support vector machine (SVM). Alternatively, the training processing unit 480 may generate a neural network that uses the index value as input and the classification of normal or abnormal or its probability as output by learning, and determine the first threshold Th1 that serves as a boundary by sampling the distribution of the output of the neural network according to the index value. The training processing unit 480 may generate the first threshold Th1 by learning using various other machine learning methods. Similarly, the training processing unit 480 may generate the second threshold Th2, which serves as the boundary for classifying the index value as normal or recommended for maintenance and inspection, by learning using a support vector machine (SVM) or other machine learning method.

In S820, the training processing unit 480 sets the determination criteria (the first threshold Th1 and second threshold Th2) learned in S810 to the diagnostic unit 430. In response to this setting, the diagnostic unit 430 diagnoses the vortex flowmeter 10 using the first threshold Th1 and second threshold Th2 newly set by the training processing unit 480.

According to the diagnostic apparatus 190 shown above, the measurement data acquired from the vortex flowmeter 10 can be used to learn the determination criteria the condition of the vortex flowmeter 10. This allows the diagnostic apparatus 190 to adjust the determination conditions according to the structure of the pipeline 16 and vortex generator 20, the density of the fluid to be measured, and other measurement environments at the location where the vortex flowmeter 10 is installed. It should be noted that the diagnostic apparatus 190 can also be configured without the training processing unit 480. In this case, the diagnostic apparatus 190 may use the preset first threshold Th1 and second threshold Th2 to diagnose the condition of the vortex flowmeter 10.

Figure 9:
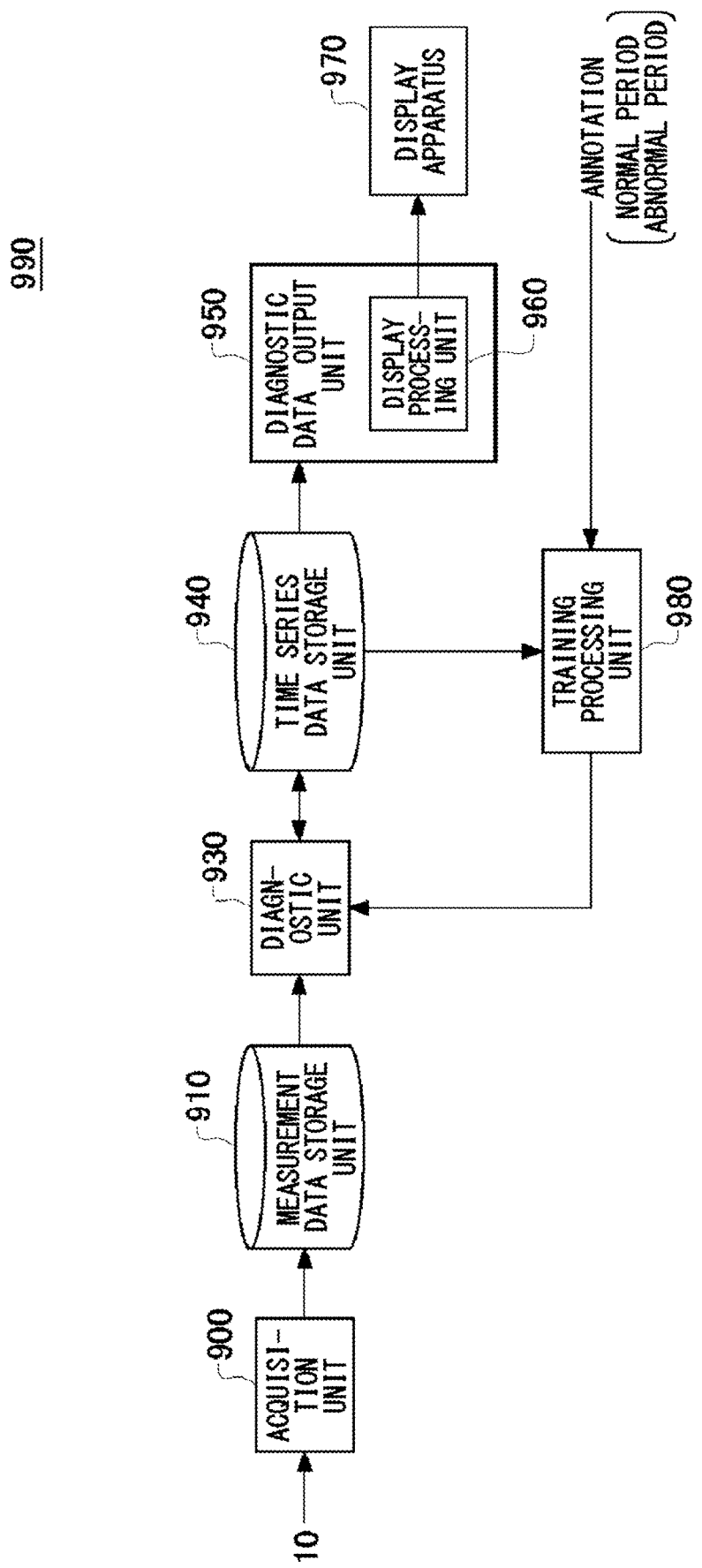
FIG. 9 illustrates a configuration of the diagnostic apparatus 990 according to a modified example of the present embodiment.

FIG. 9 illustrates the configuration of the diagnostic apparatus 990 according to a modified example of the present embodiment. The diagnostic apparatus 990 is a modified example of the diagnostic apparatus 190 shown in FIG. 4. Instead of diagnosing the condition of the vortex flowmeter 10 using the determination result of the magnitude of the signal component of the combined signal that linearly combines the first detection signal and second detection signal, it uses at least one of the one or more detection signals as the target detection signal and diagnoses the condition of the vortex flowmeter 10 using the determination result of the magnitude of the signal component of the target detection signal. Since the diagnostic apparatus 990 in the present modified example is similar to the diagnostic apparatus 190 shown in FIG. 4, the description is omitted except for the following differences.

The diagnostic apparatus 990 includes an acquisition unit 900, a measurement data storage unit 910, a diagnostic unit 930, a time series data storage unit 940, a diagnostic data output unit 950, a display apparatus 970 and a training processing unit 980. The acquisition unit 900 is connected to the vortex flowmeter 10. The acquisition unit 900 acquires, from the vortex flowmeter 10, measurement data including the magnitude of the signal component of each of the at least one target detection signal subject to diagnostic processing by the diagnostic apparatus 990 among the at least one detection signal detected by the vortex flowmeter 10 and the vortex frequency measured by the vortex flowmeter 10.

The measurement data storage unit 910 is connected to the acquisition unit 900. The measurement data storage unit 910 is similar to the measurement data storage unit 410 shown in FIG. 4, and stores the measurement data acquired by the acquisition unit 900.

The diagnostic unit 930 is connected to the measurement data storage unit 910. The diagnostic unit 930 determines the change in magnitude of the signal components of each of the at least one target detection signal. The diagnostic unit 930 diagnoses the condition of the vortex flowmeter 10 based on the determination result of this change. The time series data storage unit 940 is connected to the diagnostic unit 930 and stores time series data of the magnitude of each signal component of at least one target detection signal and the diagnostic results of the condition of the vortex flowmeter 10. Herein, the time series data storage unit 940 functions as a history storage unit that stores, as history data, the time series data that maps the magnitude of the signal component according to the vortex frequency to the vortex frequency for each of at least one target detection signal in the past.

The diagnostic data output unit 950 is connected to the time series data storage unit 940. The diagnostic data output unit 950 outputs the time series data containing the diagnostic results of the condition of the vortex flowmeter 10 stored in the time series data storage unit 940. The diagnostic data output unit 950 may include the display processing unit 960. The display processing unit 960 is configured to perform the processing to display the time series data, including the diagnostic results of the condition of the vortex flowmeter 10, on the display apparatus 970. The display apparatus 970 is connected to the diagnostic data output unit 950 and displays the display screen and other data generated by the display processing unit 960.

The training processing unit 980 is connected to the time series data storage unit 940. The training processing unit 980 generates the determination criteria by the diagnostic unit 930 by learning, using the history of the magnitude of each signal component of at least one target detection signal stored in the time series data storage unit 940. Herein, the training processing unit 980 may perform the similar learning process as the training processing unit 480 shown in FIG. 4, except that it generates by learning a determination criteria for the magnitude of each signal component of at least one target detection signal instead of the magnitude of the signal component of the combined signal.

Figure 10:
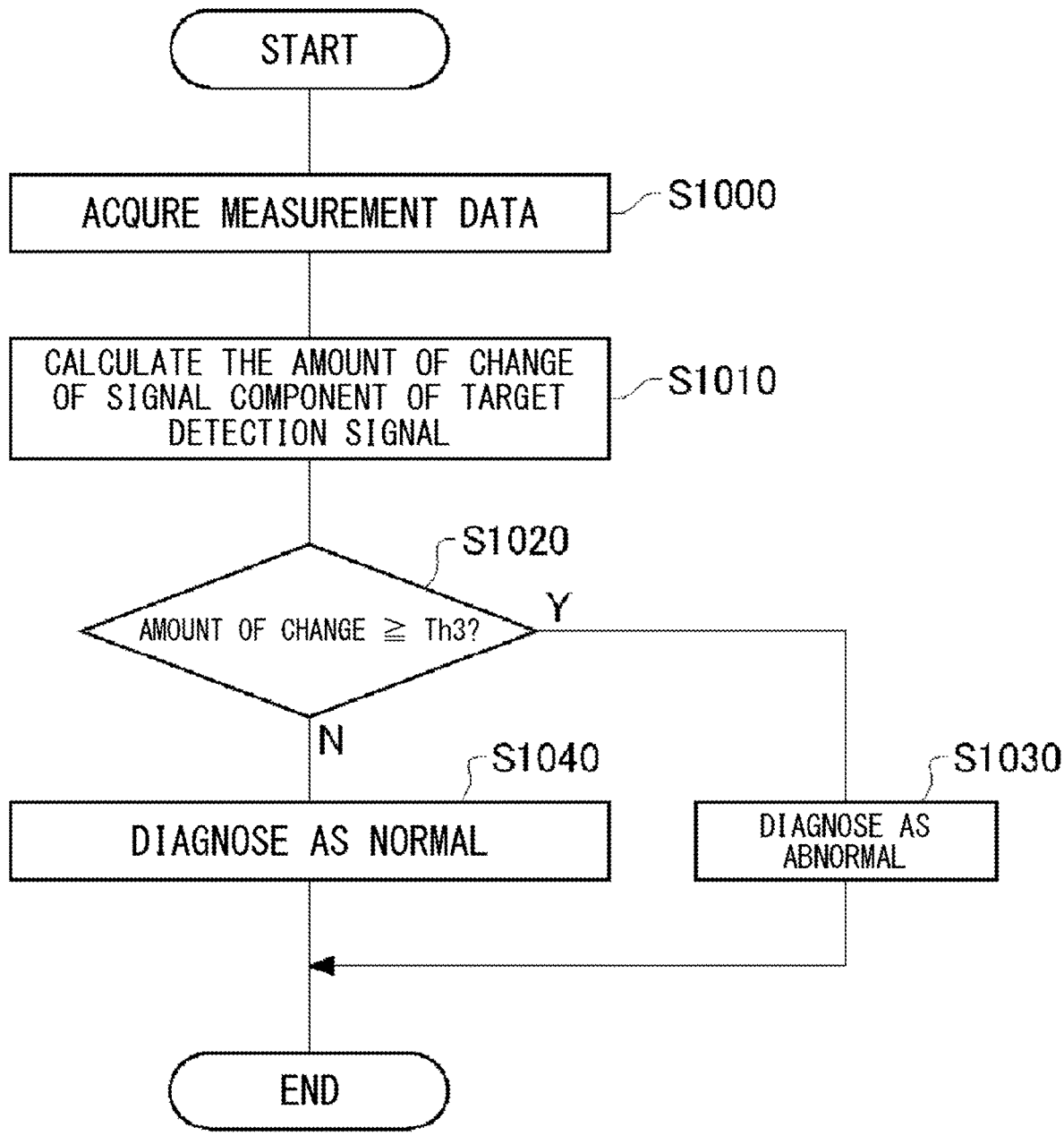
FIG. 10 illustrates a diagnostic flow of the vortex flowmeter 10 performed by the diagnostic apparatus 990 according to a modified example of the present embodiment.

FIG. 10 illustrates a diagnostic flow of the vortex flowmeter 10 by the diagnostic apparatus 990 according to the present modified example. In this diagnostic flow, the diagnostic unit 930 in the diagnostic apparatus 990 diagnoses the condition of the vortex flowmeter 10 based on the determination results of the change in the magnitude of the respective signal components of the at least one target detection signal. Herein, the diagnostic unit 930 may use one target detection signal as the target to be diagnosed, or two or more target detection signals as the target to be diagnosed. For convenience of explanation, the following explains the case where the diagnostic unit 930 targets one target detection signal to be diagnosed.

In S1000, the acquisition unit 900 acquires measurement data including the magnitude of the signal component of the target detection signal and the vortex frequency measured by the vortex flowmeter 10 from the vortex flowmeter 10. In the present embodiment, the acquisition unit 900 may, as an example, acquire the magnitude of the signal component according to the vortex frequency of the first detection signal from the CPU 160.

Herein, the vortex flowmeter 10 uses, as the magnitude of the signal component corresponding to the vortex frequency of the first detection signal, the signal intensity of the band of frequencies including the vortex frequency among the signal intensities of each of the plurality of frequency bands in the first detection signal output from the spectrum analyzer 125a to the CPU 160. This allows the diagnostic apparatus 190 to acquire the magnitude S1 of the vortex signal component in the first detection signal. The acquisition unit 900 stores the acquired measurement data in the measurement data storage unit 910.

In S1010, the diagnostic unit 930 calculates the change in the magnitude of the signal component of the target detection signal to be diagnosed. The diagnostic unit 930 reads the magnitude of the signal component of the target detection signal in the past from the time series data storage unit 940 and calculates the change in the magnitude of the signal component of the newly acquired target detection signal relative to the past value.

Herein, the magnitude of the vortex signal component of the target detection signal changes depending on the vortex frequency. Therefore, the diagnostic unit 930 calculates the change using the magnitude of the signal component corresponding to the vortex frequency corresponding to the vortex frequency of the target detection signal contained in the history data stored in the time series data storage unit 940 and the magnitude of the signal component of the target detection signal acquired by the acquisition unit 900. The diagnostic unit 930 may use the most recent one of the magnitudes of the signal components corresponding to the frequency corresponding to the vortex frequency of the target detection signal included in the history data stored in the time series data storage unit 940, or may use the one that is older than a predetermined period (one week, one month and so on), or may use the one that has the maximum magnitude within the range of predetermined period. The diagnostic unit 930 may also use the magnitude of the signal component associated with the vortex frequency corresponding to the vortex frequency vicinity of the target detection signal, which is included in the history data. For example, the diagnostic unit 930 may use, from the history data, the magnitude of the signal component corresponding to the vortex frequency included in the range of predetermined frequency widths before and after the vortex frequency of the target detection signal acquired by the acquisition unit 900. The diagnostic unit 930 may also use the magnitude of the signal component corresponding to the vortex frequency included in the same frequency band as the vortex frequency of the target detection signal acquired by the acquisition unit 900 from the history data.

In this embodiment, the diagnostic unit 930 uses the amount of change, which is the difference between the past value and the current value, as an index of the change in the magnitude of the signal component of the target detection signal. This amount of change may be the amount of decrease from the past value to the current value (that is, the value of the past value minus the current value). Alternatively, the diagnostic unit 930 may use other index such as the rate of change as an index of the change in the magnitude of the signal component of the target detection signal.

In S1020, the diagnostic unit 930 determines whether the amount of change calculated in S1010 is greater than or equal to the third threshold Th3, and diagnoses the condition of the vortex flowmeter 10 based on this determination result. If the amount of change is equal to or greater than the third threshold Th3 ("Y" in S1020), the magnitude of the signal component of the newly acquired target detection signal is significantly lower compared to the magnitude of the past signal component corresponding to the same vortex frequency in that target detection signal. Therefore, the diagnostic unit 930 diagnoses that the vortex flowmeter 10 is abnormal at S1030. In response, the time series data storage unit 940 stores the diagnostic results corresponding to the measurement data, and the diagnostic data output unit 950 outputs the diagnostic results as being abnormal.

If the amount of change is less than the third threshold Th3 ("N" in S1020), the magnitude of the signal component of the newly acquired target detection signal has not decreased much compared to the magnitude of the past signal component corresponding to the same vortex frequency in that target detection signal. Therefore, the diagnostic unit 930 diagnoses that the vortex flowmeter 10 is normal at S1040. In response, the time series data storage unit 940 stores the diagnostic results corresponding to the measurement data, and the diagnostic data output unit 950 outputs the diagnostic results as being normal.

In the diagnostic flow shown above, the diagnostic apparatus 990 diagnoses the vortex flowmeter 10 using a single target detection signal. Alternatively, the diagnostic apparatus 990 may diagnose the vortex flowmeter 10 using two or more target detection signals. That is, the acquisition unit 900 acquires measurement data including the magnitude of the signal component of each of the two or more target detection signals from the vortex flowmeter 10, and the diagnostic unit 930 diagnoses the condition of the vortex flowmeter 10 based on the determination results of the change in the magnitude of the signal component according to the vortex frequency of each of the two or more target detection signals.

Here, the diagnostic unit 930 may diagnose that the vortex flowmeter 10 is abnormal if, in S1020, the amount of change for at least one target detection signal among two or more target detection signals is equal to or greater than the third threshold Th3 corresponding to the target detection signal. Alternatively, the diagnostic unit 930 may diagnose that the vortex flowmeter 10 is abnormal when the amount of change is equal to or greater than the third threshold Th3 for each target detection signal for all of the two or more target detection signals in S1020. In this case, the third threshold Th3 may take a different value for each target detection signal.

According to the diagnostic apparatus 990 shown above, the condition of the vortex flowmeter 10 can be diagnosed based on the determination result of the change in the magnitude of the signal component of the target detection signal, so there is no need to use a combined signal that is a linear combination of two or more detection signals. Therefore, the diagnostic apparatus 990 can diagnose vortex flowmeters 10 that do not generate a combined signal for flow rate or flow velocity measurement, or that do not have the function to output a combined signal externally for diagnostic purposes.

It should be noted that according to the diagnostic apparatus 990 shown above, the diagnosis is performed using the magnitude of the signal component corresponding to the vortex frequency corresponding to the vortex frequency of the target detection signal, which is included in the history data. Alternatively, the diagnostic apparatus 990 may normalize the magnitude of the signal component of the target detection signal contained in the newly acquired target detection signal and history data by the vortex frequency and use it for diagnosis, in the same way that the diagnostic apparatus 190 shown in FIG. 4 normalizes the magnitude of the signal component of the vortex flow signal SQ by the vortex frequency.

In this case, the diagnostic apparatus 990 may be equipped with a normalization unit similar to the normalization unit 420 shown in FIG. 4, which normalizes the magnitude of the signal components of each of the at least one target detection signal by the vortex frequency. Then, in the same way as the diagnostic unit 430 shown in FIG. 4 determines the vortex flow signal SQ, the diagnostic unit 930 may diagnose that the vortex flowmeter is abnormal based on the determination result that the normalized magnitude of the signal component of each of the at least one target detection signal is less than or equal to the first threshold value for each of the at least one target detection signal. Such a diagnostic unit 930 may predict when the vortex flowmeter 10 becomes abnormal, similar to the diagnostic unit 430 shown in FIG. 4. In this case, the diagnostic apparatus 990 can perform diagnosis using the magnitude of the signal component included in the history data that is associated with a different vortex frequency than that of the newly acquired target detection signal.

Instead of diagnosing the condition of the vortex flowmeter 10 based on the determination result of the change in the magnitude of the signal component of the target detection signal, the diagnostic apparatus 990 may diagnose the condition of the vortex flowmeter 10 based on the determination result of the change in the magnitude of the signal component of the vortex flow signal SQ instead of the target detection signal. In this case, the diagnostic apparatus 990 may not need to normalize the vortex flow signal SQ, and calculates the change in the magnitude of the signal component using the magnitude of the signal component corresponding to the vortex frequency in the vortex flow signal SQ acquired by the acquisition unit 900 and the magnitude of the signal component corresponding to the vortex frequency in the past vortex flow signal SQ recorded in the history data, in the same way as the method shown in FIG. 9 and FIG. 10.

Various embodiments of the present invention may be described with reference to flowcharts and block diagrams, whose blocks may represent (1) steps of processes in which operations are executed or (2) units of apparatuses responsible for executing operations. Certain steps and sections may be implemented by a dedicated circuit, programmable circuit supplied with computer readable instructions stored on computer readable media, and/or processors supplied with computer readable instructions stored on computer readable media. A dedicated circuit may include digital and/or analog hardware circuits and may include integrated circuits (IC) and/or discrete circuits. Programmable circuit may include reconfigurable hardware circuits comprising logical AND, OR, XOR, NAND, NOR, and other logical operations, flip-flops, registers, memory elements and so on, such as field-programmable gate arrays (FPGA), programmable logic arrays (PLA), and the like.

Computer readable media may include any tangible device that can store instructions for execution by a suitable device, such that the computer readable medium having instructions stored therein comprises an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

Computer-readable instructions may be provided to a processor of a programmable data processing apparatus such as a general-purpose computer, special purpose computer, or another computer, or to programmable circuit, locally or via a local area network (LAN), wide area network (WAN) such as the Internet and so on, so that the computer-readable instructions are executed to create means for executing operations specified in the flowcharts or block diagrams. Examples of the processor include a computer processor, a processing unit, a microprocessor, a digital signal processor, a controller, a microcontroller, and the like.

Figure 11:
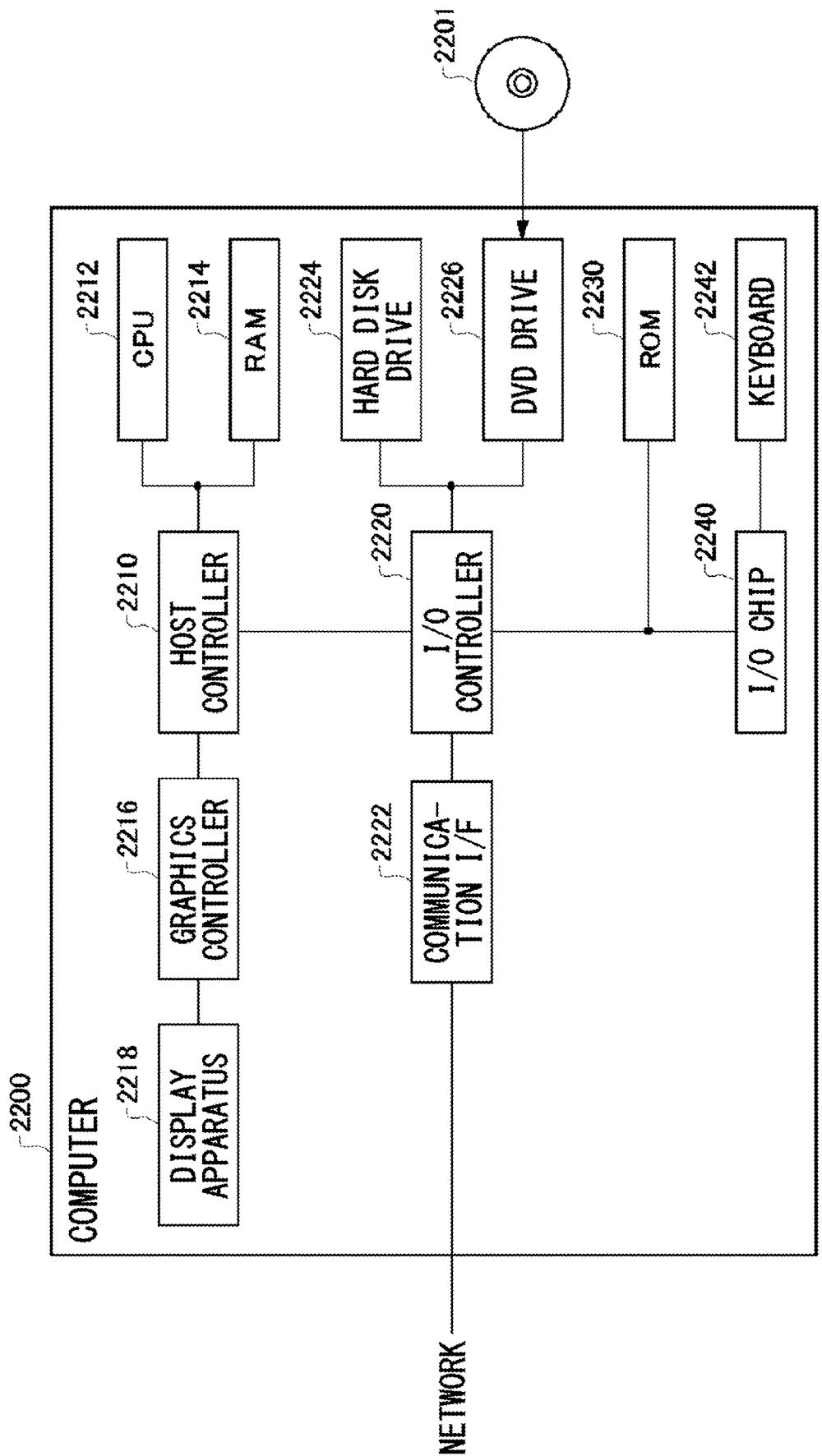
FIG. 11 illustrates an example of a computer 2200 in which a plurality of aspects of the present invention may be embodied entirely or partially.

FIG. 11 shows an example of computer 2200 where a plurality of aspects of the present invention may be entirely or partially embodied. A program that is installed in the computer 2200 can cause the computer 2200 to function as operations associated with apparatuses according to the embodiments of the present invention or one or more sections of the apparatuses, or can cause the computer 2200 to execute the operations or the one or more sections thereof, and/or can cause the computer 2200 to execute processes according to the embodiments of the present invention or steps of the processes. Such a program may be executed by a CPU 2212 to cause the computer 2200 to execute certain operations associated with some or all of the blocks of flowcharts and block diagrams described herein.

The computer 2200 according to the present embodiment includes the CPU 2212, a RAM 2214, a graphics controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from a DVD-ROM 2201, and provides the hard disk drive 2224 with the programs or the data via the RAM 2214. The IC card drive reads programs and data from an IC card, and/or writes programs and data into the IC card.

The ROM 2230 stores, in itself, a boot program or the like that is executed by the computer 2200 during activation, and/or a program that depends on hardware of the computer 2200. The input/output chip 2240 may also connect various input/output units to the input/output controller 2220 via a parallel port, a serial port, a keyboard port, a mouse port, or the like.

A program is provided by the computer-readable medium such as the DVD-ROM 2201 or the IC card. The program is read from the computer-readable medium, installed in the hard disk drive 2224, the RAM 2214, or the ROM 2230, which is also an example of the computer-readable medium, and executed by the CPU 2212. Information processing written in these programs is read into the computer 2200, resulting in cooperation between a program and the above-described various types of hardware resources described above. An apparatus or method may be constituted by realizing the operation or processing of information in accordance with the usage of the computer 2200.

For example, when a communication is executed between the computer 2200 and an external device, the CPU 2212 may execute a communication program loaded in the RAM 2214, and instruct the communication interface 2222 to process the communication based on the processing written in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (the DVD-ROM 2201), the IC card and so on, and execute various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may execute, on the data read from the RAM 2214, various types of processing including various types of operations, information processing, conditional judgement, conditional branch, unconditional branch, information search/replacement, and the like as described throughout the present disclosure and designated by an instruction sequence of programs, and writes back the result to the RAM 2214. Moreover, the CPU 2212 may search for information in the file, the database, or the like in the recording medium. For example, when a plurality of entries each having an attribute value of a first attribute correlated with an attribute value of a second attribute, are stored in the recording medium, the CPU 2212 may search for an entry matching a condition whose attribute value of the first attribute is designated, from among the plurality of entries, and read the attribute value of the second attribute stored in the entry, thereby acquiring the attribute value of the second attribute correlated with the first attribute that satisfies a predetermined condition.

The above-described program or software modules may be stored in the computer-readable media on the computer 2200 or near the computer 2200. In addition, a recording medium such as a hard disk or a RAM provided in a server system connected to a dedicated communication network or the Internet can be used as a computer-readable medium, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

5: measurement apparatus; 10: vortex flowmeter; 16: pipeline; 20: vortex generator; 24: gap; 30: detection unit; 34a to b: piezoelectric element; 100a to b: charge converter; 110a to b: A/D converter; 120: gate array; 125a to b: spectrum analyzer; 130: adder; 135: spectrum analyzer; 140: band pass filter; 145: Schmitt trigger; 150: counter; 160: CPU; 170: output circuit; 180: display unit; 190: diagnostic apparatus; 400: acquisition unit; 410: measurement data storage unit; 420: normalization unit; 430: diagnostic unit; 440: time series data storage unit; 450: diagnostic result output unit; 460: display processing unit; 470: display apparatus; 480: training processing unit; 900: acquisition unit; 910: measurement data storage unit; 930: diagnostic unit; 940: time series data storage unit; 950: diagnostic data output unit; 960: display processing unit; 970: display apparatus; 980: training processing unit; 990: diagnostic apparatus; 2200: computer; 2201: DVD-ROM; 2210: host controller; 2212: CPU; 2214: RAM; 2216: graphics controller; 2218: display device; 2220: input/output controller; 2222: communication interface; 2224: hard disk drive; 2226: DVD-ROM drive; 2230: ROM; 2240: input/output chip; 2242: keyboard

What is claimed is:

1. A diagnostic apparatus, comprising
a diagnostic unit configured to diagnose a condition of a vortex flowmeter having a vortex generator using a determination result of a combined signal component of each of at least two target detection signals among a plurality of detection signals detected by the vortex flowmeter, the diagnostic unit storing a change over an elapse of time of the combined signal component of each of the at least two target detection signals, the diagnostic unit being further configured to predict a future time that the vortex flowmeter will be abnormal based on a predicted determination result that a normalized magnitude of the combined signal component of the at least two combined signals is greater than a first threshold, and equal to or less than a second threshold; and a detection unit configured to detect the plurality of detection signals according to a vortex generated by the vortex generator.

2. The diagnostic apparatus according to claim 1, wherein the diagnostic unit is further configured to diagnose the condition of the vortex flowmeter based on another determination result obtained by comparing the magnitude of the combined signal component of the at least two combined signals with a threshold.

3. The diagnostic apparatus according to claim 2, further comprising
a normalization unit configured to normalize the magnitude of the combined signal component of the at least two combined signals by a vortex frequency.

4. The diagnostic apparatus according to claim 3, wherein the diagnostic unit is further configured to diagnose that the vortex flowmeter is abnormal, based on an abnormal determination result that the normalized magnitude of the combined signal component of the at least two combined signals is equal to or less than a first threshold.

5. The diagnostic apparatus according to claim 4, further comprising
a training processing unit configured to produce the first threshold by learning, using a history of the normalized magnitude of the combined signal component of the at least two combined signals.

6. The diagnostic apparatus according to claim 5, further comprising:
a time series data storage unit configured to store time series data of the normalized magnitude of the combined signal component of the at least two combined signals; and
a display processing unit configured to perform display processing to display the time series data.

7. The diagnostic apparatus according to claim 4, further comprising
a training processing unit configured to produce the first threshold by learning, using a history of the normalized magnitude of the combined signal component of the at least two combined signals.

8. The diagnostic apparatus according to claim 4, further comprising:
a time series data storage unit configured to store time series data of the normalized magnitude of the combined signal component of the at least two combined signals; and
a display processing unit configured to perform display processing to display the time series data.

9. The diagnostic apparatus according to claim 4, further comprising:
a time series data storage unit configured to store time series data of the normalized magnitude of the combined signal component of the at least two combined signals; and
a display processing unit configured to perform display processing to display the time series data.

10. The diagnostic apparatus according to claim 3, further comprising:
a time series data storage unit configured to store time series data of the normalized magnitude of the combined signal component of the at least two combined signals; and
a display processing unit configured to perform display processing to display the time series data.

11. A measurement apparatus, comprising:
the diagnostic apparatus; and
the vortex flowmeter according to claim 2.

12. The diagnostic apparatus according to claim 1, wherein
the diagnostic unit is further configured to diagnose the condition of the vortex flowmeter, based on a change determination result of a change of a magnitude of the combined signal component of the at least two target detection signals.

13. The diagnostic apparatus according to claim 12, wherein
the diagnostic unit is further configured to diagnose the condition of the vortex flowmeter, based on the change determination result of the change of the magnitude of the combined signal component corresponding to a vortex frequency of each of the at least two target detection signals.

14. The diagnostic apparatus according to claim 13, comprising
a history storage unit configured to store history data configured to map the magnitude of the combined signal component corresponding to the vortex frequency to a past vortex frequency for each of the at least two target detection signals; wherein
the diagnostic unit is further configured to diagnose the condition of the vortex flowmeter, based on a difference determination result of a difference between the magnitude of the combined signal component corresponding to the vortex frequency, corresponding to a vortex frequency of the at least two target detection signals to be diagnosed and included in the history data, and the magnitude of the combined signal component of each of the at least two target detection signals to be diagnosed.

15. The diagnostic apparatus according to claim 1, further comprising
a normalized unit configured to normalize the magnitude of the combined signal component of each of the at least two target detection signals by a vortex frequency.

16. The diagnostic apparatus according to claim 15, wherein
the diagnostic unit is further configured to diagnose that the vortex flowmeter is abnormal, based on the normalized determination result that the normalized magnitude of the combined signal component of each of the at least two target detection signals is equal to or less than a first threshold according to each of the at least two target detection signals.

17. A measurement apparatus, comprising:
the diagnostic apparatus; and
the vortex flowmeter according to claim 1.

18. A diagnostic method, comprising:
acquiring a magnitude of a combined signal component of each of at least two target detection signals among a plurality of detection signals detected by a vortex flowmeter having a vortex generator and a detection unit configured to detect the plurality of detection signals according to a vortex generated by the vortex generator;

storing a change over an elapse of time of the magnitude of the combined signal component of each of the at least two target detection signals;

predicting a future time that the vortex flowmeter will be abnormal based on a predicted determination result that a normalized magnitude of the combined signal component of the at least two combined signals is greater than a first threshold, and equal to or less than a second threshold; and diagnosing a condition of the vortex flowmeter using a determination result of the magnitude of the combined signal component of each of the at least two target detection signals.

19. A non-transitory computer-readable medium with a diagnostic program recorded thereon which, when executed by a computer, causes the computer to function as a diagnostic unit configured to diagnose a condition of a vortex flowmeter having a vortex generator using a determination result of a combined signal component of each of at least two target detection signals among a plurality of detection signals detected by the vortex flowmeter, the diagnostic unit storing a change over an elapse of time of the combined signal component of each of the at least two target detection signal, the diagnostic unit being further configured to predict a future time that the vortex flowmeter will be abnormal based on a predicted determination result that a normalized magnitude of the combined signal component of the at least two combined signals is greater than a first threshold, and equal to or less than a second threshold; and a detection unit configured to detect a magnitude of the combined signal component of at least two of the plurality of detection signals according to a vortex generated by the vortex generator.

* * * * *